US006760861B2

(12) United States Patent
Fukuhara et al.

(10) Patent No.: US 6,760,861 B2
(45) Date of Patent: Jul. 6, 2004

(54) SYSTEM, METHOD AND APPARATUS FOR DATA PROCESSING AND STORAGE TO PROVIDE CONTINUOUS OPERATIONS INDEPENDENT OF DEVICE FAILURE OR DISASTER

(75) Inventors: Keith T. Fukuhara, Belmont, CA (US); Alan S. Gin, Foster City, CA (US)

(73) Assignee: ZeroNines Technology, Inc., Castle Rock, CO (US)

( * ) Notice: Subject to any disclaimer, the term of this patent is extended or adjusted under 35 U.S.C. 154(b) by 0 days.

(21) Appl. No.: 10/134,666

(22) Filed: Apr. 26, 2002

(65) Prior Publication Data

US 2003/0159083 A1 Aug. 21, 2003

Related U.S. Application Data

(63) Continuation-in-part of application No. 09/676,699, filed on Sep. 29, 2000.

(51) Int. Cl.[7] .................................................. G06F 11/00
(52) U.S. Cl. .......................................... 714/4; 709/203
(58) Field of Search ............................ 714/4; 709/203; 707/3, 4

(56) References Cited

U.S. PATENT DOCUMENTS

| | | | |
|---|---|---|---|
| 5,812,748 A | 9/1998 | Ohran et al. | |
| 5,951,694 A | 9/1999 | Choquier et al. | |
| 5,974,562 A | 10/1999 | Townsend et al. | |
| 5,987,621 A | 11/1999 | Duso et al. | |
| 6,038,682 A | 3/2000 | Norman | |
| 6,055,599 A | 4/2000 | Han et al. | |
| 6,058,424 A | * 5/2000 | Dixon et al. | ................. 709/226 |
| 6,069,986 A | 5/2000 | Kim | |
| 6,078,957 A | 6/2000 | Adelman et al. | |
| 6,085,234 A | 7/2000 | Pitts et al. | |
| 6,098,094 A | 8/2000 | Barnhouse et al. | |
| 6,105,122 A | 8/2000 | Muller et al. | |
| 6,122,743 A | 9/2000 | Shaffer et al. | |
| 6,134,673 A | * 10/2000 | Chrabaszcz | ................... 714/13 |
| 6,182,111 B1 | * 1/2001 | Inohara et al. | ............... 709/201 |

(List continued on next page.)

FOREIGN PATENT DOCUMENTS

WO    WO 98/54887    12/1998

OTHER PUBLICATIONS

Davis, Scott H., Digital Clusters for Windows NT, printed from the Internet: http://www.microsoft.com/win32dev/base/ntcluwp2.htm, Feb. 1995, 10 pages.

Jander, Mary and Heywood, Peter, Cisco Touts Storage–Over–IP Project, printed from the Internet: http://www.lightreading.com/document.asp?site=lightreading&doc_id=36429, Jul. 2, 2003, 3 pages, Light Reading, Inc.

Primary Examiner—Robert Beausoliel
Assistant Examiner—Christopher S. McCarthy
(74) Attorney, Agent, or Firm—Dorsey & Whitney LLP

(57) ABSTRACT

A system, method, and apparatus for providing continuous operations of a user application at a user computing device. At least two application servers are provided with each application server running the user application concurrently and independently. Each application server may have a persistent storage device associated with it for storing data. In response to a user request for data processing within the user application, the user request is transmitted to the at least two application servers for processing therein. A return result—responsive to the user request as processed by the one of the at least two application servers—is passed to the user computing device from one of the at least two application servers. In this manner, if one of the application servers fails or becomes unavailable due to a disaster or otherwise, the user requests can be continuously processed by at least the other application server without any delays.

4 Claims, 27 Drawing Sheets

U.S. PATENT DOCUMENTS

| | | |
|---|---|---|
| 6,185,695 B1 | 2/2001 | Murphy et al. |
| 6,192,483 B1 | 2/2001 | Moiin et al. |
| 6,199,069 B1 * | 3/2001 | Dettinger et al. ............ 707/202 |
| 6,216,051 B1 * | 4/2001 | Hager, III et al. ............ 700/82 |
| 6,223,231 B1 * | 4/2001 | Mankude ..................... 710/38 |
| 6,247,141 B1 * | 6/2001 | Holmberg ..................... 714/2 |
| 6,292,905 B1 | 9/2001 | Wallach et al. |
| 6,304,967 B1 * | 10/2001 | Braddy ....................... 713/150 |
| 6,539,494 B1 * | 3/2003 | Abramson et al. ............. 714/4 |
| 6,553,401 B1 | 4/2003 | Carter et al. |
| 2002/0042818 A1 * | 4/2002 | Helmer et al. .............. 709/217 |
| 2003/0014526 A1 * | 1/2003 | Pullara et al. .............. 709/227 |

* cited by examiner

| IP ADDRESS | SOCKET ID | PROCESSING THREAD |
|---|---|---|
| 192.168.1.5 | 9001 | ADDRESS OF THREAD X |
| 192.168.1.7 | 9002 | ADDRESS OF THREAD Y |

FIG.27

| APPLICATION DOM. ID | USER SESSION ID | INBOUND QUEUE |
|---|---|---|
| AP.VOUCHER | 20 | ADDRESS OF QUEUE X |
| AR.ADJUSTMENT | 23 | ADDRESS OF QUEUE Y |

FIG.28A

| APPLICATION DOM. ID | USER SESSION ID | INBOUND QUEUE |
|---|---|---|
| 100.10 | 20 | ADDRESS OF QUEUE X |
| 200.30 | 23 | ADDRESS OF QUEUE Y |

FIG.28B

SYSTEM, METHOD AND APPARATUS FOR DATA PROCESSING AND STORAGE TO PROVIDE CONTINUOUS OPERATIONS INDEPENDENT OF DEVICE FAILURE OR DISASTER

CROSS REFERENCE TO RELATED APPLICATION

This application is a continuation-in-part of and claims priority to co-pending, commonly assigned U.S. patent application Ser. No. 09/676,699 entitled "FAULT TOLERANT, STATE-COMPATIBLE COMPUTER SYSTEM AND METHOD," filed Sep. 29, 2000, the disclosure of which is hereby incorporated by reference in its entirety.

TECHNICAL FIELD

This application relates, in general, to computing and methods for providing continuous computing operations despite a disaster, device failure or other cause of device unavailability.

BACKGROUND

Computing systems, such as systems having servers and databases supporting multiple users over a network, may utilize various techniques to provide data reliability in the event of a device failure—such as a failure of a primary database. For example, the contents of a database may be replicated to other mass secondary or backup storage devices, and an image of the state of the computing system may be periodically saved as well to secondary storage devices. In the event of a device failure or a disaster affecting the primary database, a secondary storage device is made to functionally replace the primary storage device for the computing system.

As recognized by the present inventors, after a device failure in such an arrangement, the time for transitioning from the primary to the secondary system devices may be lengthy and result in delays in the completion of computing operations that were scheduled prior to the device failure. There also may be delays in users having network access to a working computing system when the primary network or primary storage device become unavailable. Such delays may result in significant loss of revenues for businesses that rely on computing systems, or may result in an inferior quality of service experienced by the user. In the financial industry, downtime of a brokerage computing network may result in the loss of millions of dollars in revenues to the brokerage firm and to its customers.

For example, and as recognized by the present inventors, if a primary server (such as an application server) or a database fails or becomes unavailable due to a disaster, then the secondary or backup system needs to be mounted, the state of the computing system (including each of the various states of all of the user devices in the system) needs to be restored and rectified with the state of the data stored on the secondary storage device (i.e., all pointers need to be loaded into the backup system), and all user connections to the computing system need to be restored or re-established. Such a transitioning process may involve a delay of, for example, fifteen minutes to complete. During this delay period, users may be unable to continue with their use of their computing system. Further, the state of the computing system—including the various states of all of the user devices—may only be recoverable to the time at which the last image of the computing system was persistently saved. Hence, particular users may experience a loss of some data or may be unable to complete time-critical computing operations.

As recognized by the present inventors, what is needed is a system and method for data processing and/or data storage that provides continuous operations independent of device failure or disaster—so that failures or unavailability of system devices, such as application servers or databases, are transparent to end users.

It is against this background that various embodiments of the present invention were developed.

SUMMARY OF THE INVENTION

According to one embodiment of the invention, a method for providing continuous operations of a user application at a user computing device is disclosed. The method includes providing at least two servers, such as application servers, with each server running the user application concurrently and independently. Each server may have a persistent storage device associated with it for storing data. In response to a user request for data processing within the user application, the user request is transmitted to the at least two servers for processing therein. Both servers process the user request, in one embodiment. A return result—corresponding to the user request as processed by one of the at least two servers—is passed to the user computing device. In this manner, both servers are running state accurate versions of the user application and if one of the servers fails or becomes unavailable due to a disaster or otherwise, the user requests can be continuously processed by at least the other server without any delays.

Persistent storage devices may be associated with the at least two servers to provide additional data reliability, wherein a first persistent storage device is associated with a first server of the at least two servers, and wherein a second persistent storage device is associated with a second server of the at least two servers. Furthermore, the at least two servers may be physically located at the same location, (i.e., in a data center or in a rack) or may be physically located at different locations so as to provide geographic isolation between the servers.

According to another embodiment of the invention, an apparatus for processing communications between a user device and at least two servers is disclosed. The apparatus may include a module for receiving a user request relating to an application program; a module for transmitting the user request to the at least two servers for processing therein; and a module for forwarding to the user device a result received from one of the at least two servers, wherein the result is related to the user request. The apparatus may also include one or more buffers for storing a plurality of requests received from the user device, and for storing a plurality of results received from the at least two servers.

According to another embodiment of the present invention, a system for providing continuous operations of a user application at a user computing device is disclosed. The system may include at least two servers, each server having a persistent storage device associated with it, and each server adapted to run the user application. A multicasting device is provided and processes communications between the user computing device and the at least two servers. In one example, in response to a user request for data processing within the application, the multicasting device transmits the user request to the at least two servers for processing therein. Each of the at least two servers processes the user request, in one embodiment. The multicasting device passes a return result to the user computing device from one of the at least two servers, the return result corresponding to the user request as processed by the one of the at least two servers. In one example, the multicasting device is embodied as a server coupled with a network. Further, the operating system of the first and second servers can be different operating systems, as the multicasting device may be platform independent.

According to another embodiment of the invention, a method for processing communications between a user device and at least two servers is disclosed. The method includes receiving a user request relating to an application program; transmitting the user request to the at least two servers for processing therein; and forwarding to the user device a result received from one of the at least two servers, wherein the result is related to the user request.

According to another embodiment of the present invention, a method for providing a continuously operating computing system for an application service provider having a plurality of servers servicing a plurality of user devices, each user device having a user session including user requests relating to at least one application program is disclosed. The method includes configuring at least two servers to each run the application program. A multicasting server is provided for receiving a user request relating to the application program, the multicasting server transmitting the user request to the at least two servers for processing therein. Upon receiving a first result from one of the at least two servers, the first result is forwarded to the user device. In this manner, if one of the servers is unavailable due to a disaster or otherwise, the user request can be continuously processed by at least the other server.

The features, utilities and advantages of various embodiments of the invention will be apparent from the following more particular description of embodiments of the invention as illustrated in the accompanying drawings.

DESCRIPTION OF THE DRAWINGS

FIG. 27 illustrates an example of a table which may be used to map a user device or server with a corresponding processing thread.

FIGS. 28A–28B illustrate examples of tables which may be used by a message processor to determine if a message should be processed or ignored.

DETAILED DESCRIPTION

According to one broad aspect of the invention, disclosed herein is a system and method for data processing and/or data storage which provides continuous computing operations independent of device failures or unavailability. In this manner, if a system device such as a server, a database, or a storage device fails or becomes unavailable due to disaster or otherwise, users are unaffected by such events and may continue to complete their computing operations and continue with new computing operations. Various embodiments of the invention will now be discussed.

Figure 1:
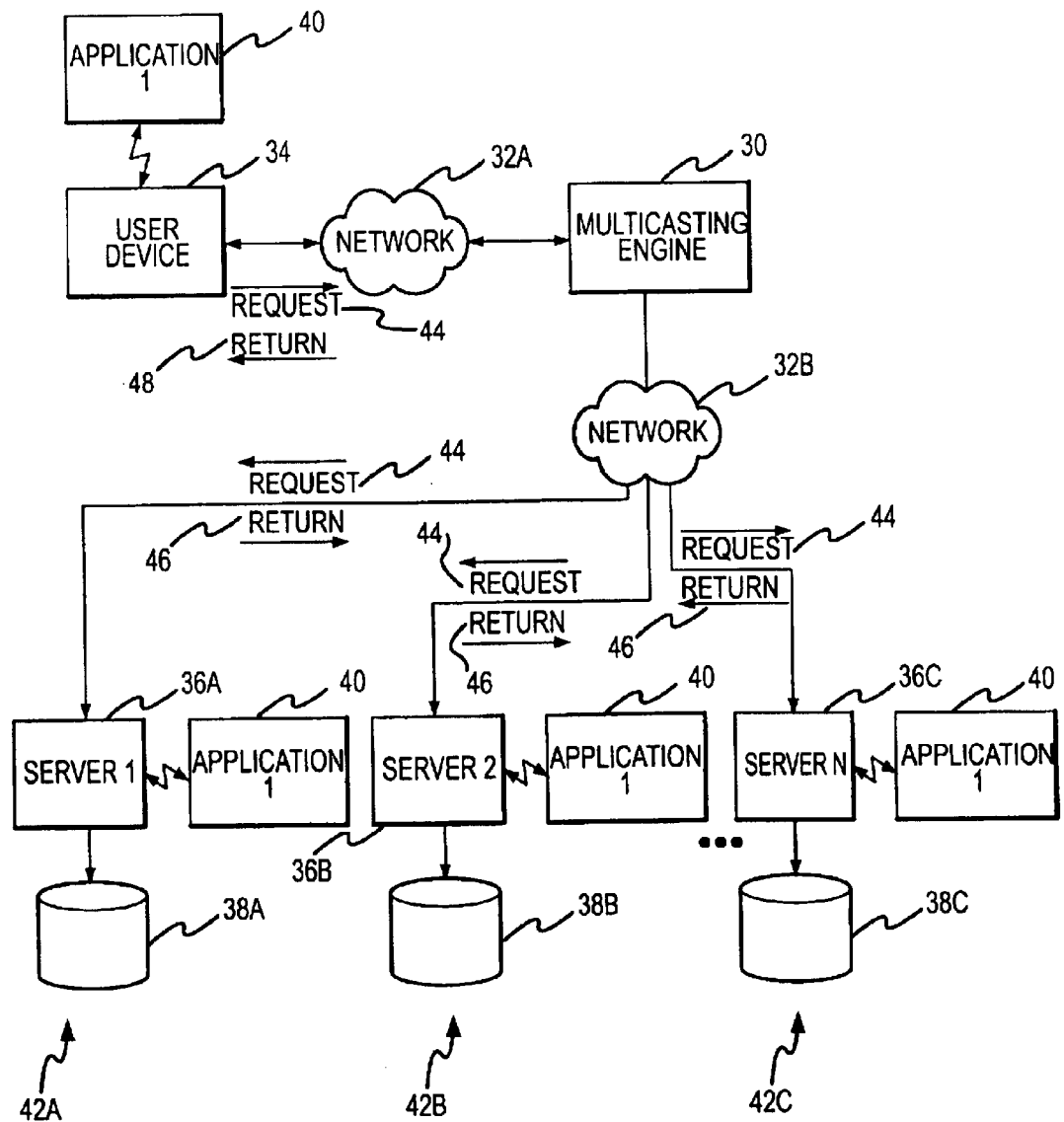
FIG. 1 illustrates a block diagram of an embodiment of the present invention.

Referring to FIG. 1 and in accordance with one embodiment of the present invention, a multicasting device or engine 30 is coupled over a network 32A, 32B with a user device 34 and with two or more servers 36A, 36B, 36C (referred to collectively as 36) each having a storage device 38A, 38B, 38C, respectively, associated therewith for providing multiple, redundant, state-accurate operating versions of the application or applications 40 being run by the user device 34 and the data associated therewith. Each of the servers 36A, 36B, 36C with or without an associated storage device, 38A, 38B, 38C may be referred to herein interchangeably as a data center or a node 42A, 42B, 42C.

As will be described below in greater detail, the multicasting engine 30 manages data flow between the user device 34 and the two or more servers 36 to provide continuous networked data processing irrespective of a failure of, or disaster affecting, one of the servers 36A, 36B, 36C or data centers 42A, 42B, 42C.

The multicasting device or engine 30 may be implemented as a server or may be implemented as one or more modules operating at one or more servers or distributed throughout a network. In one example, the multicasting engine 30 can be a router, such as a messaging router, or may be a computer, such as a SUN NETRA (TM) computer, running an operating system such as LINUX. The multicasting engine 30 may be compliant with NEBS (Network Equipment Building System). Alternatively, some or all portions of the multicasting engine as described herein may be implemented as software modules operating on one or more computing devices.

The multicasting engine 30 may have, in one embodiment, one or more ports coupled with one or more networks 32A, 32B. These ports may be functional or virtual in nature, as the multicasting engine 30 may have physical connections that may handle multiple functional or virtual ports. For instance, the multicasting engine 30 may be implemented using bi-directional ports, which receive and transmit data over network connections using, for example, packetized data using Internet Protocol (IP) formats. Other data formats, such as Ethernet, may be used or supported by the multicasting engine 30, for example, through the use of one or more media adapters, to transmit and receive data over various different networks 32A, 32B depending upon the particular implementation.

In one embodiment, networks 32A, 32B are both IP networks. In another embodiment as discussed below with reference to FIG. 23, network 32A is a SCSI or fibre channel communication link, and network 32B is an IP network. It is understood that the types of network or networks in which embodiments of the present invention are implemented is a matter of choice depending upon the particular implementation.

In accordance with one embodiment of the present invention, each of the two or more servers 36A, 36B, 36C will be concurrently running, in real time, the application or applications 40 that the user device 34 is running, and the multicasting engine 30 will distribute user requests 44 for application processing—containing, for example, commands and/or data—to the two or more servers 36. The multicasting engine 30 will also handle receiving the results 46 returned from the two or more servers 36A, 36B, 36C and provides a single result 48 to the user device 34. In this manner, the user device 34 operates without knowledge of the fact that its applications 40 are transparently being hosted and run redundantly and independently by different servers 36A, 36B, 36C. If one of the servers 36A, 36B, or 36C or data centers 42A, 42B, or 42C fails or becomes unavailable due to a disaster or otherwise, then at least one other server/data center is immediately available and is already aware of the precise state of the user's device's computing operations. In this scenario, the multicasting engine 30 continues operating with at least one operational server or data center in order to satisfy the further computing requests of the user device 34. Since each of the servers 36A, 36B, 36C or data centers 42A, 42B, 42C has been independently running the application(s) 40 of the user device 34 over the network, each server 36A, 36B, 36C or data center 42A, 42B, 42C has all the state variables (i.e., pointers) already loaded and all network connections already established. In this manner, the system of FIG. 1 provides the user device 34 with continuous fault-tolerant access to its data and to a working networked system irrespective of a server or data center failure or unavailability due to, for example, a disaster.

In one embodiment the servers 36A, 36B, 36C may be arranged as independently operating data centers 42A, 42B, 42C, each having a plurality of application servers operating in an environmentally-controlled and protected area. In one embodiment, the servers are each provided with one or more storage devices 38, such as persistent mass storage devices, and these storage devices 38 may be configured to provide data recovery or redundancy at the data center 42A, 42B, 42C in the event of a failure of a storage device. For example, each storage device 38 may be implemented as a disk array such as a redundant array of inexpensive disks (RAID), in one example, or may utilize disk mirroring technology, or any combination thereof. The servers 36A, 36B, 36C may also be file servers, in one example.

Further, the servers 36A, 36B, 36C or data centers 42A, 42B, 42C may be located in geographically different locations so as to provide security and locational or geographic independence. In this manner, if one of the servers 36A, 36B, 36C or data centers 42A, 42B, 42C is in a building subject to an extreme environmental condition such as a power surge/outage, fire, failure of the air conditioning system, or disaster, then due to the geographic separation, the other servers 36A, 36B, 36C or data centers 42A, 42B, 42C will be unaffected by such extreme environmental conditions. The servers may use the same operating systems or may use different operating systems, such as LINUX, UNIX, Microsoft's Windows 98, NT, or 2000 operating systems, DEC VAX, IBM 390 (a mainframe operating system) or IBM MVS or AIX, HP UX, Sun SOLARIS (TM) or other operating systems, depending on the particular implementation. As will be described below, the multicasting engine 30 may be platform independent.

In accordance with one embodiment of the present invention, two or more of the servers 36A, 36B, 36C or data centers 42A, 42B, 42C may act as the application server for a user device 34 by maintaining the applications and data being run by the user device 34 independently and completely on each server 36A, 36B, 36C. The request 44 may contain instructions and/or data or other information, and the request 44 may relate to a user session including an instance of a user or process running a process or an application, such as an application on a server. A few examples of user sessions may include, but are not limited to, an order entry session, an account session, a word processing session, a gaming session, a bidding or auction session, an inventory management session, a data search session, a data read/write/modify session, a file save or file open session, or the like.

The multicasting engine 30 receives a user request 44 for data processing by an application 40 and multicasts or transmits this request 44 to two or more servers 36A, 36B, 36C for processing thereby. Each server 36A, 36B, 36C independently and completely processes the user request 44 and generates a return result 46, which each server 36A, 36B, 36C transmits to the multicasting engine 30. The return result 46 could include multiple data items encoded as multiple messages or data streams including text, graphics, audio, or other data.

Because each server 36A, 36B, 36C is independently running a copy of the application 40 and is independently processing the request 44, the processing operations by the servers 36A, 36B, 36C or data centers 42A, 42B, 42C are asynchronous with regard to the other servers or data centers.

In one example, the multicasting engine 30 selects a first return result 46 received and forwards this return result (shown as 48 in FIG. 1) to the user device 34 so that further user operations may take place. In this manner, multiple applications can be run redundantly and independently by the two or more servers 36A, 36B, 36C, so that if one server of the servers 36A, 36B, 36C fails or becomes unavailable, that failure is transparent to the user device's computing processes. In one example, the existence of multiple servers may be transparent to the user device 34 and to each of the servers 36A, 36B, 36C.

Figure 2:
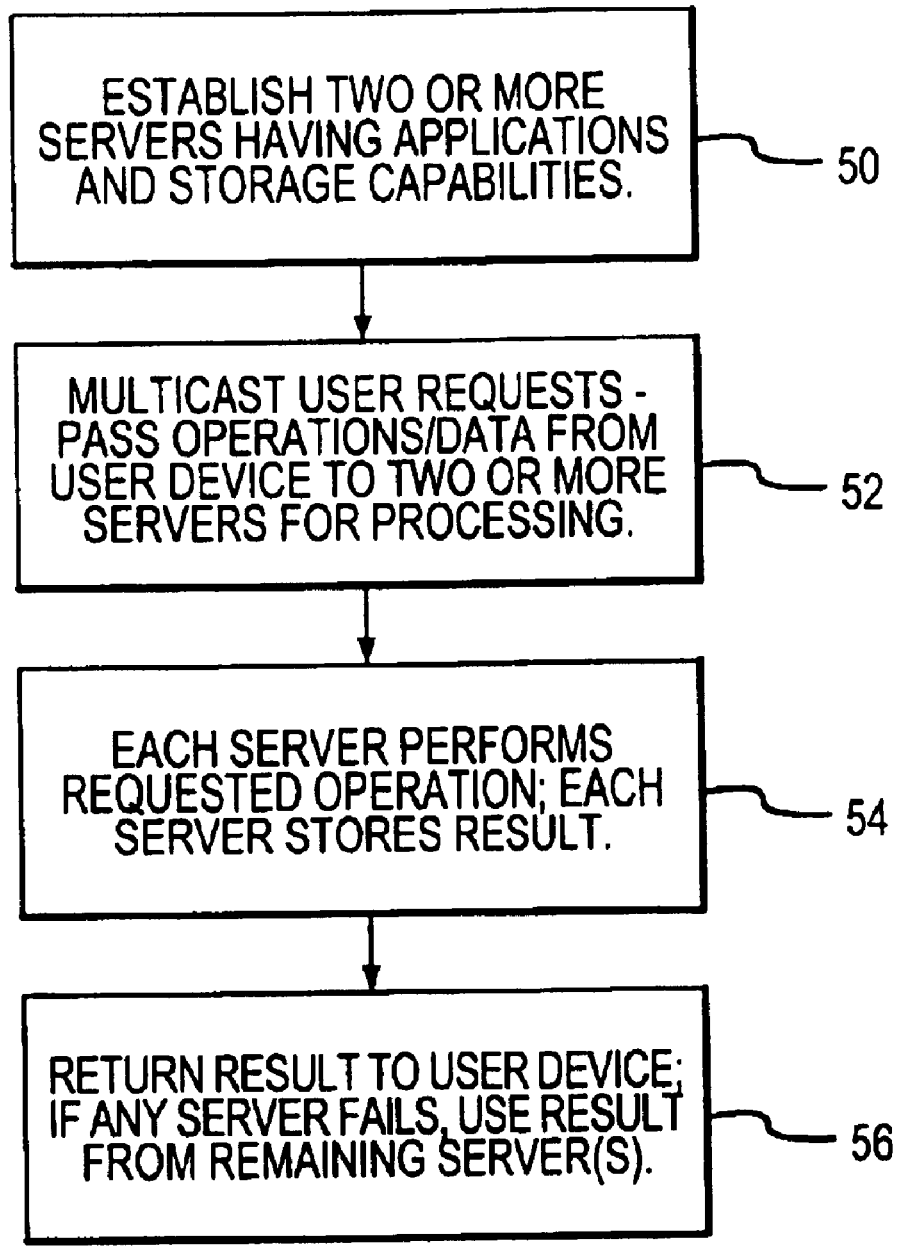
FIG. 2 illustrates a flow diagram of one example of a process for data processing and/or data storage to provide continuous operations independent of device failure or disaster, in accordance with an embodiment of the present invention.

Referring to FIG. 2, a flow diagram of one example of a process for data processing and/or storage to provide continuous operations independent of device failure or disaster is illustrated. At operation 50, two or more servers or data centers are established to each have or host one or more applications that may be run by a user. Further, the servers or data centers may be provided with persistent storage capabilities to locally store data at the site. In one embodiment, each of the servers is adapted to run some or all of the various applications and processes of an enterprise available to a user device. At operation 52, in response to a user request, the user request and any data associated therewith is transmitted or multicast to the two or more servers—which are capable of handling the user request—for processing. At operation 54, each server independently and completely performs the requested operation, and in one embodiment the results of the operation may be stored (i.e., persistently) by each server. At operation 56, each server transmits the results of its operations so that a result can be passed to the user device 34. In one embodiment a multicasting engine is provided to receive multiple results from two or more servers, receives multiple results from the servers, and the multicasting engine forwards a single result to the user device. In one example, when the multicasting engine receives the results from each of the two or more servers, the results as received are queued. The multicasting engine 30 forwards one copy of the results to the user device, so that the user device 34 only receives one copy of the result. The multicasting engine awaits receipt of the results from the other server(s) or data center(s), but in one example does not transfer more than one result to the user device—assuming that the transfer to the user device of the first result received is successful.

Because each server established by operation 50 is, at operation 54, independently processing and maintaining the program operations of the user, in the event that a single server fails or is struck by disaster or otherwise becomes unavailable, that failure is transparent to the user since the results from the non-failed server may be passed to the user by operation 56. The non-failed server can then continue to service the computing needs of the user device 34.

Referring to the example shown in FIG. 1, a user device 34 is coupled with a multicasting engine 30, which communicates with at least two servers 36A, 36B, 36C data centers 42A, 42B—shown as Server 1 and Server 2. Each data center 42A, 42B has a storage device 38A, 38B, respectively and at least two servers 36A, 36B adapted to host the applications running on the user device 34. The user's computing device 34 is running an application 40, shown as "Application 1." In accordance with the present invention, at least Server 1 36A and Server 2 36B are also running "Application 1" and are at the same program state as is the user device 34. Server 36C, shown as Server N, is also shown as running "Application 1," because depending on the level of redundancy desired, more than two servers can each independently and redundantly run the user application.

In one example, where a first level of availability for application 40 is desired, then the two servers 36A, 36B are provided to each maintain state-accurate versions of the application 40. In another embodiment, where a second level of availability for application 40 is desired, then three servers 36A, 36B, 36C are provided to each maintain state-accurate versions of the application 40. In another embodiment, where a third level of availability for application 40 is desired, more than three servers may be provided to each maintain state-accurate versions of application 40. By continuing to add servers 36, a target level of availability can be achieved approaching 100% availability.

When the user device 34 generates a request 44 for processing—such as when a user double-clicks a link within a browser to obtain a desired data set—the request 44 is sent to the multicasting engine 30, which transmits the request 44 to at least Server 1 and Server 2. Server 1 and Server 2, operating independently, both receive and process the request 44. When Server 1 has completed its operation, Server 1 stores the result of the requested data set in its storage device 38A and returns the result 46 to the multicasting engine 30. Before, after, or during this time, Server 2 completes its operation and Server 2 stores the result of the requested data set in its storage device 38B and returns the result 46 to the multicasting engine 30. The multicasting engine 30 receives, at some time, the result from Server 1 and Server 2 (not necessarily in that order), and forwards a single result 48 to the user device 34. In this manner, although the multicasting engine 30 receives multiple results, the user device 34 only receives a single copy 48 of the result (i.e., the requested data set), in one example.

Assuming that the user device 34 generates a second request, the multicasting engine 30 transmits the second request to the at least two data centers 42A, 42B at Server 1 and Server 2. If the data center 42B at Server 2 (36B) has failed or become unavailable due to a disaster, Server 2 (36B) will not generate a return response to the request, but the data center 42A at Server 1 (36A) will process the request in its normal operations and transmit the return result to the multicasting engine 30. The multicasting engine 30 will forward the return result from the data center 42A at Server 1 (36A) to the user device 34, and the user device 34 can proceed with its computing operations despite the fact that the data center 42B at Server 2 (36B) is unavailable. Accordingly, it can be seen that the system of FIG. 1 can provide continuous data operations in the event of a failure of either Server 1 (36A) or Server 2 (36B).

Figure 3:
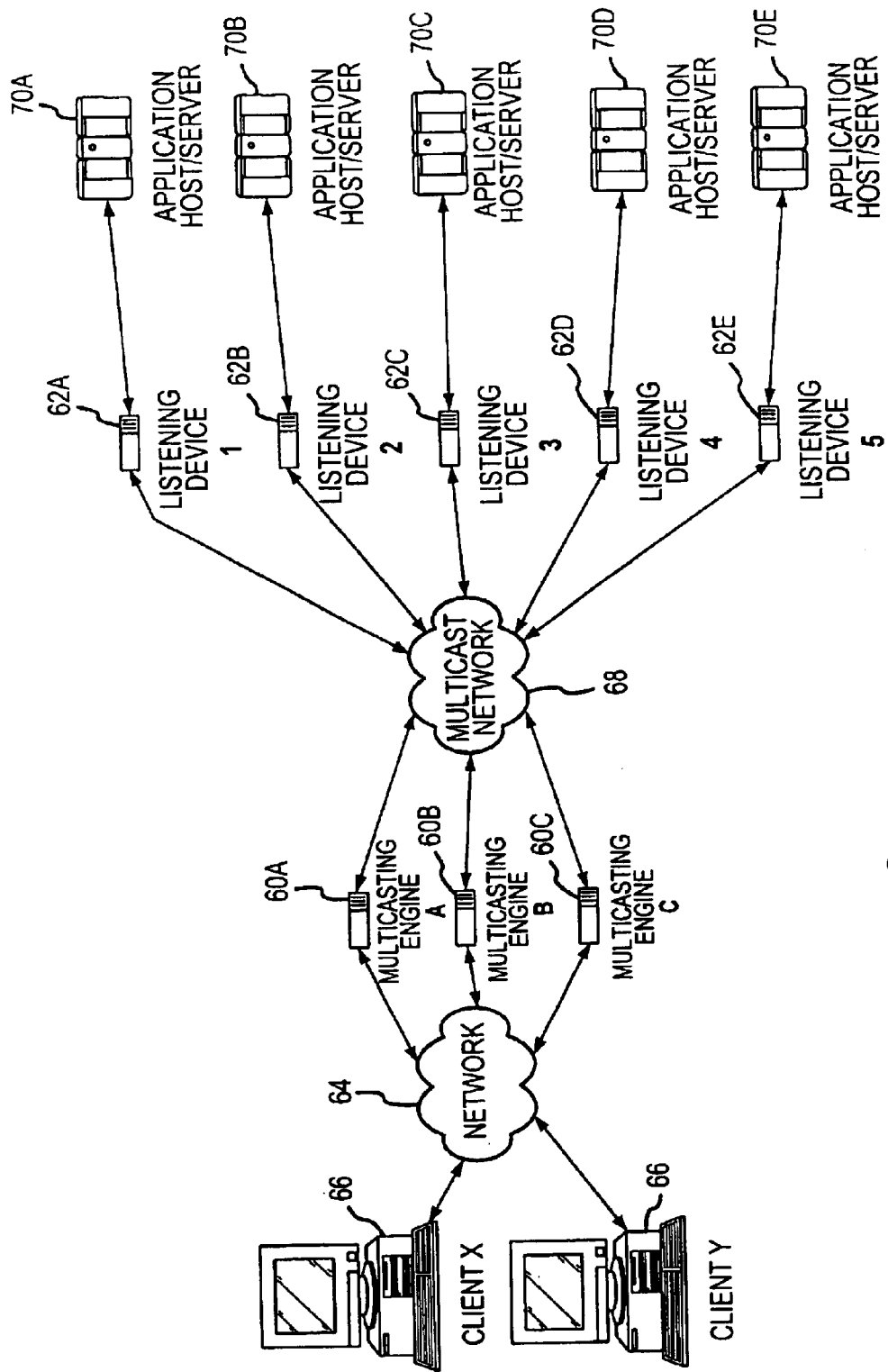
FIG. 3 illustrates a block diagram of a network employing a plurality of multicasting engines, listening devices, and servers for data processing and/or storage to provide continuous operations independent of device failure or disaster, in accordance with one embodiment of the present invention.

FIGS. 3–21 illustrate examples of a system and processes thereof for data processing and storage to provide continuous operations independent of device failure or disaster, in accordance with an embodiment of the present invention. Referring now to FIG. 3, an example of a networked system utilizing multicasting engines, for example, 60A, 60B, 60C (referred to collectively or generically as 60) and listening devices, for example, 62A, 62B, 62C, 62D, 62E (referred to collectively or generically as 62) is illustrated, in accordance with one embodiment of the present invention. A plurality of multicasting engines 60A–C are present and receive processing requests over a network 64 from one or more clients 66, shown as client X and client Y. As will be described in greater detail below, one or more of the multicasting engines 60A–C process a user request and transmits or multicasts the request over a multicast network 68 to at least two of the listening devices 62A–62E, wherein each listening device 62A–E is in communication with a server 70A–E capable of satisfying the request. As will be described below, a listening device can be a stand-alone device or may be implemented as hardware components or as software modules operating within a respective server.

As shown in FIG. 3, multiple multicasting engines 60A–C are present and the multicasting engines 60A–C may be configured to have fail-over capabilities, wherein each multicasting engine 60A–C may have a state accurate, shadowing engine that can take over if a multicasting engine 60A–C fails. For instance, multicasting engine 60B may shadow multicasting engine 60A so that if multicasting engine 60A becomes unavailable, multicasting engine 60B may take over the operations of multicasting engine 60A. Alternatively, two or more multicasting engines may be clustered in order to provide load balancing and high availability.

As shown in FIG. 3, each server 70A–E is associated with a listening device 62A–E, and the listening device may be a separate device or may be implemented as hardware integrated with the server or one or more software modules running on the associated server. In overall operation, when a client (such as client X) makes a request, a multicasting engine (such as 60B) services the request by passing the request to at least two listening devices (such as 62B and 62D), which each completely and independently process the request using the respective servers (such as 70B and 70D) associated with the listening devices. The return results generated by the servers are returned by the respective listening device to the multicasting engine 60B, which passes a result back to the client 66. In this manner, if one of the servers becomes unavailable, then the user/client session can continue to seamlessly operate without significant delay using the remaining listening device and associated server.

Figure 4A:
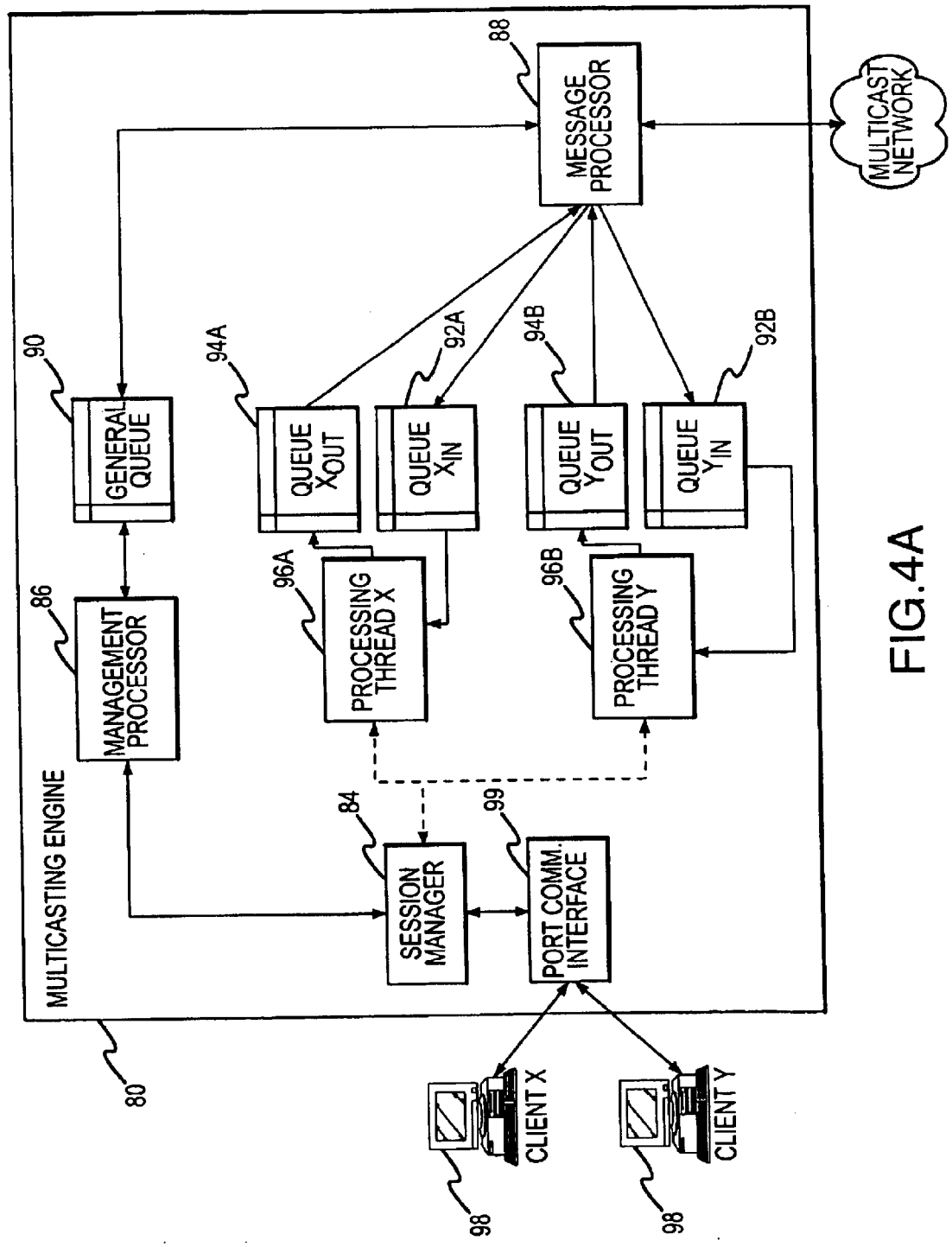
FIG. 4A illustrates a block diagram of a multicasting engine communicating with at least two client devices and a network.
Figure 4B:
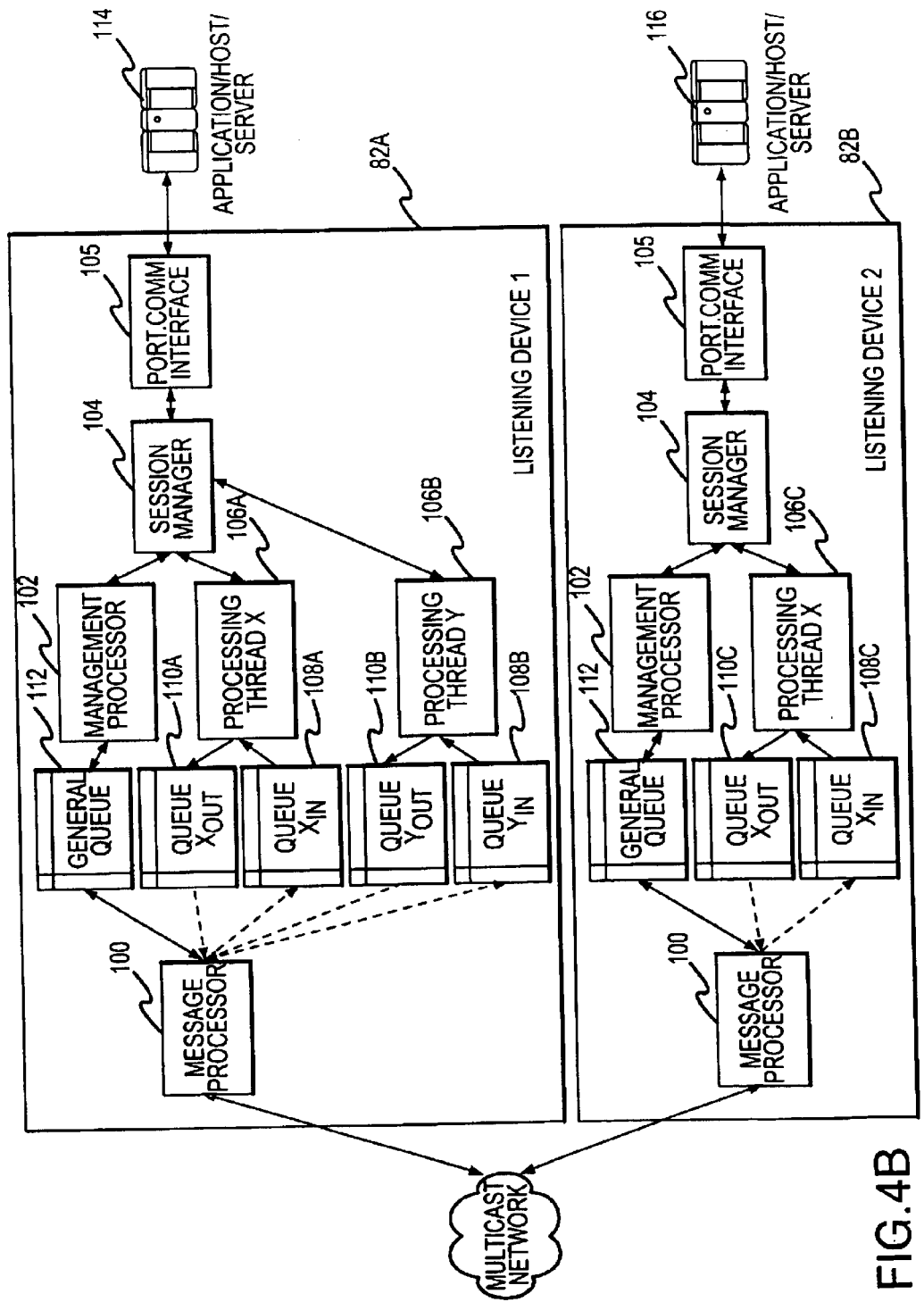
FIG. 4B illustrates a block diagram of first listening device in communications with a first server, and a second listening device in communications with a second server, wherein both listening devices are coupled with a network.

Referring now to FIGS. 4A and 4B, a block diagram of an example of a multicasting engine 80 and two listening devices 82A–B is illustrated, in accordance with an embodiment of the present invention. In FIG. 4A, a multicasting engine 80 is implemented in this embodiment using a session manager 84, a management processor 86, and a message processor 88. A plurality of queues are also utilized, including a general queue 90, and a plurality of inbound client session queues 92A–B and outbound client session queues 94A–B. Further, depending upon the number of user sessions being handled by the multicasting engine 80, one or more processing threads (shown as 96A–B) will be spawned and operate within the multicasting engine 80. In one embodiment, the session manager 84, the management processor 86, and the message processor 88 are implemented as software modules running on a programmable device such as a Sun Netra (TM) device, in one example.

Figure 9:
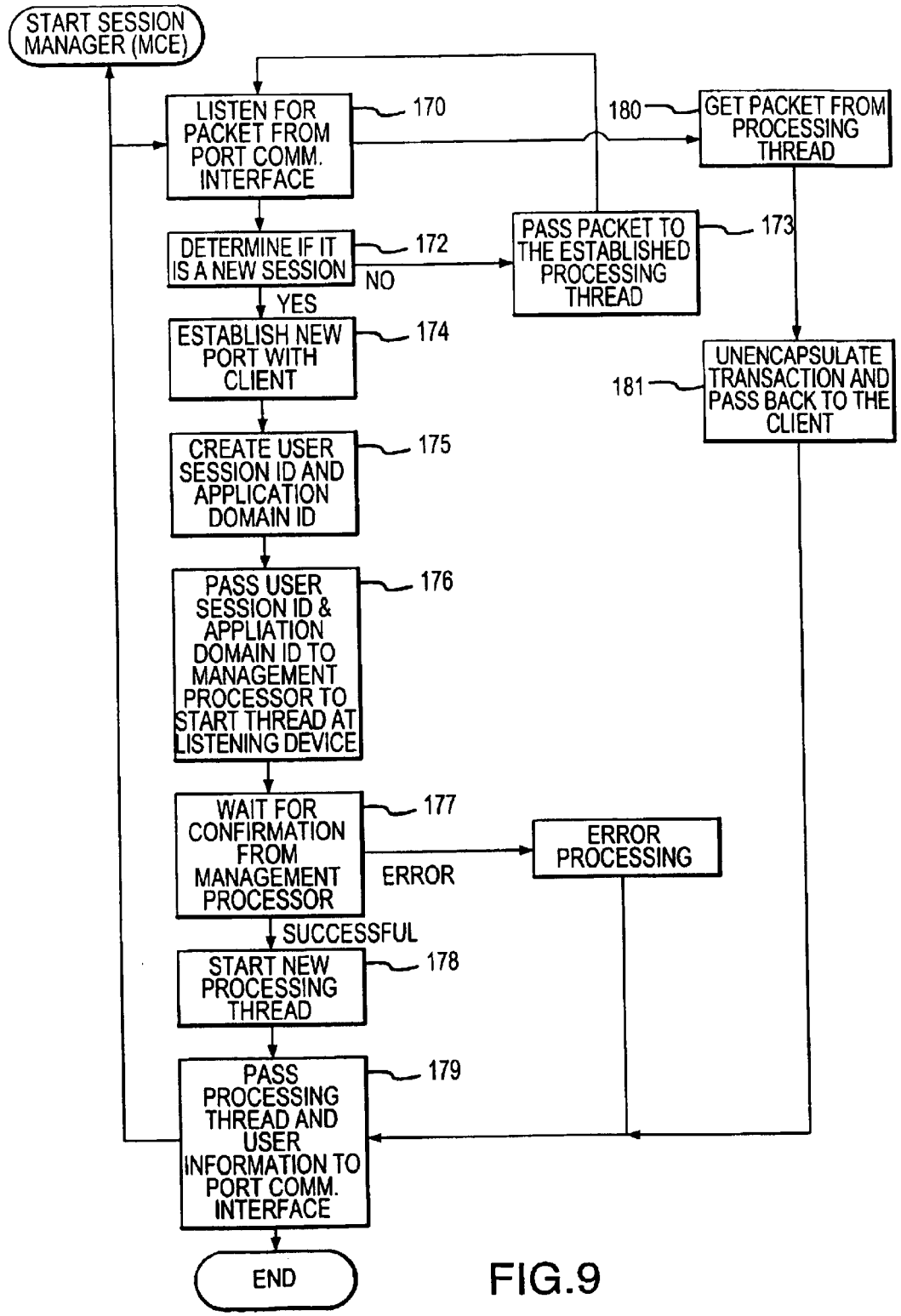
FIG. 9 illustrates an example of logical operations performed by a session manager module of a multicasting engine.

In the embodiment of FIG. 4A, the session manager 84 is generally responsible for receiving communications from a client/user device 98 and establishing, if needed, user sessions and spawning the appropriate processing threads 96 for handling these user sessions. Various operations of one embodiment of a session manager 84 are illustrated in FIG. 9.

Figure 10:
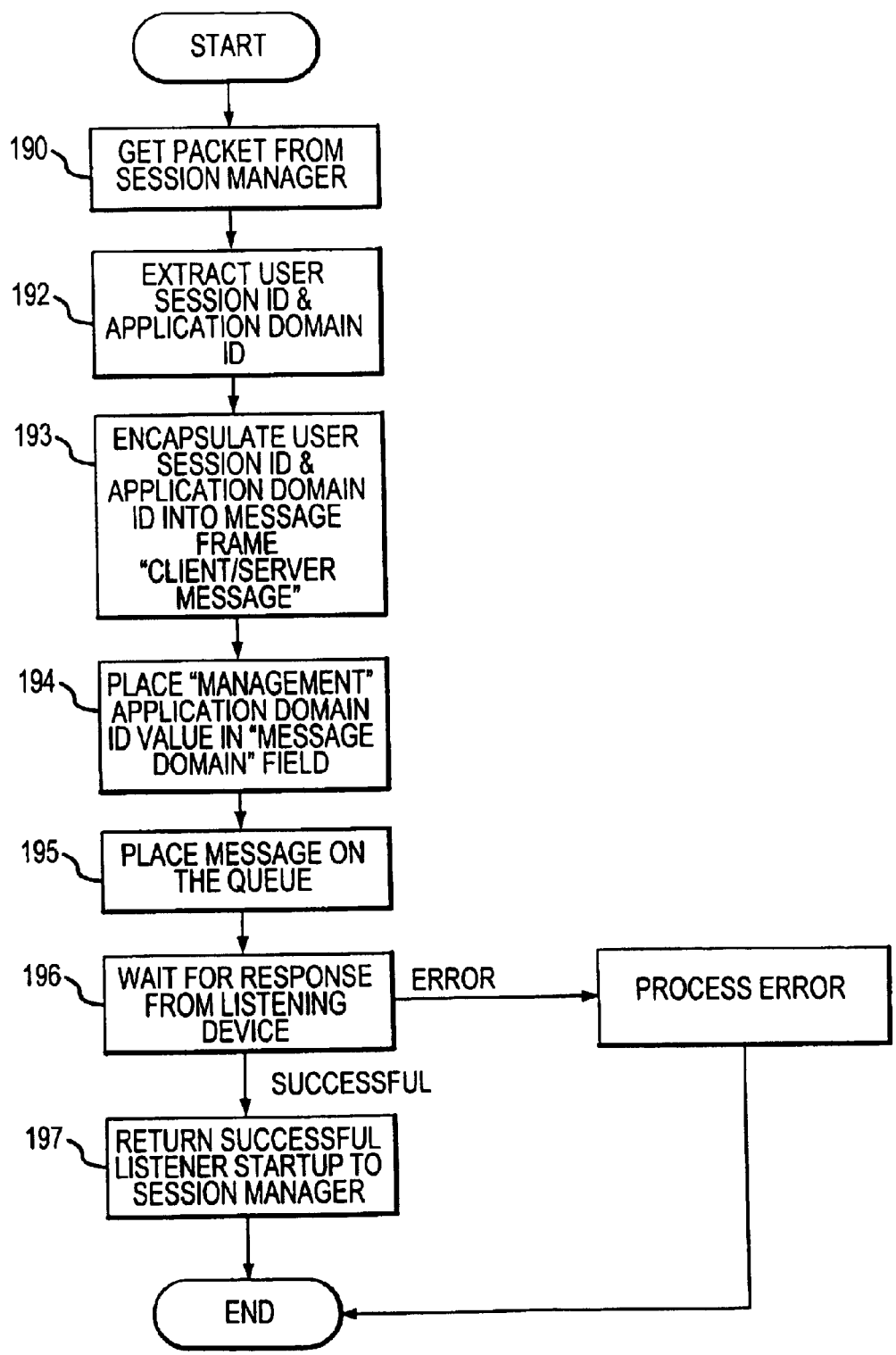
FIG. 10 illustrates an example of logical operations performed by a management processor module of a multicasting engine.

The management processor 86 of the multicasting engine 80 of the embodiment of FIG. 4A is generally responsible for starting and managing user sessions on the appropriate listening device 82A, 82B corresponding to the user sessions of the multicasting engine 80. The management processor may determine if a user's request can be handled, and may maintain or access a list of supported applications. Various operations of one embodiment of a management processor 86 are illustrated in FIG. 10.

Figure 11:
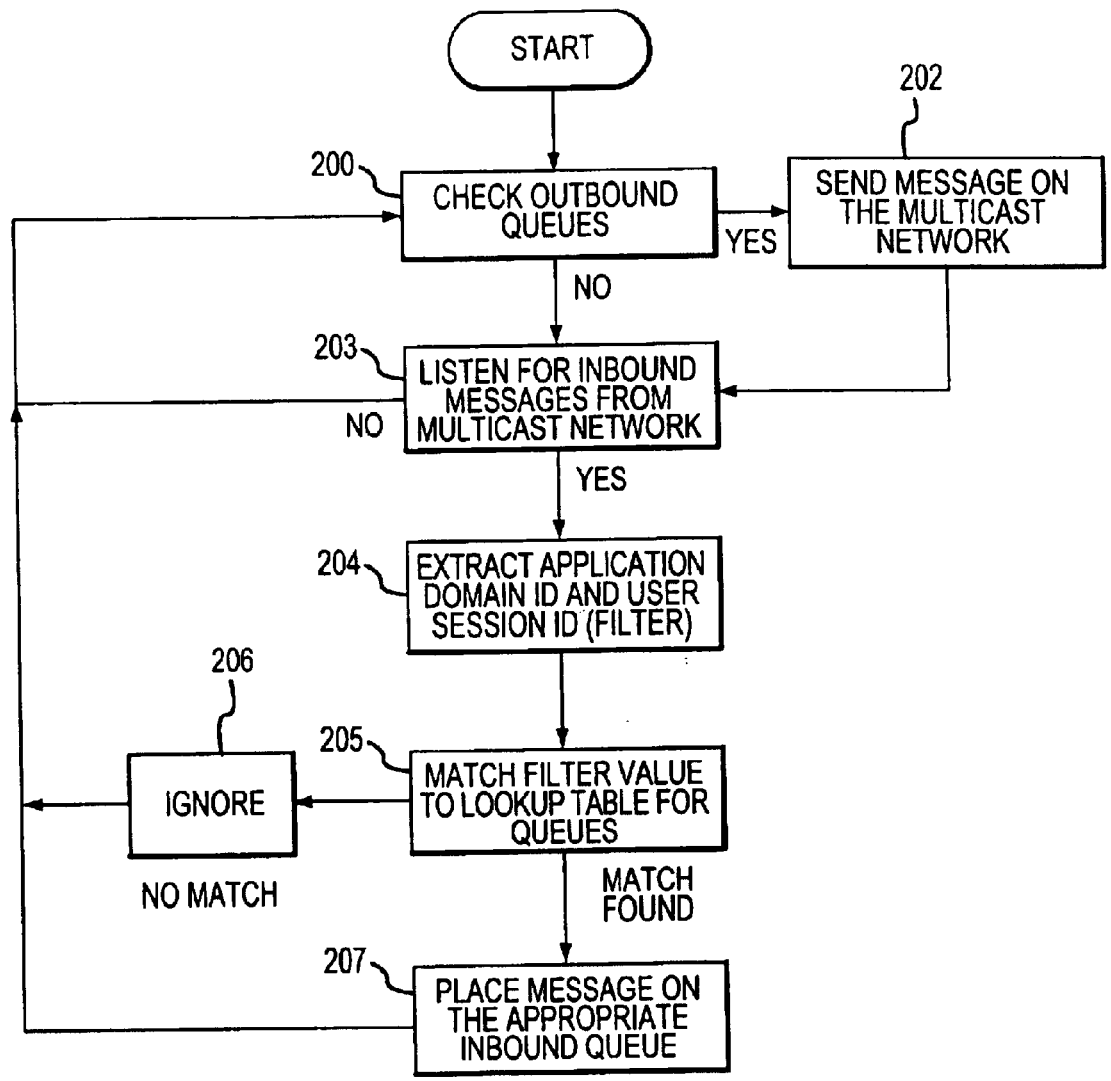
FIG. 11 illustrates an example of logical operations performed by a message processor module of a multicasting engine.

The message processor 88 of a multicasting engine 80 of the embodiment of FIG. 4A is generally responsible for transmitting messages from the multicasting engine 80 to the listening devices 82A, 82B as well as for receiving messages from the listening devices 82A, 82B to be passed into the multicasting engine 80 for processing therein. Various operations of a message processor 86 are illustrated in FIG. 11.

Figure 12:
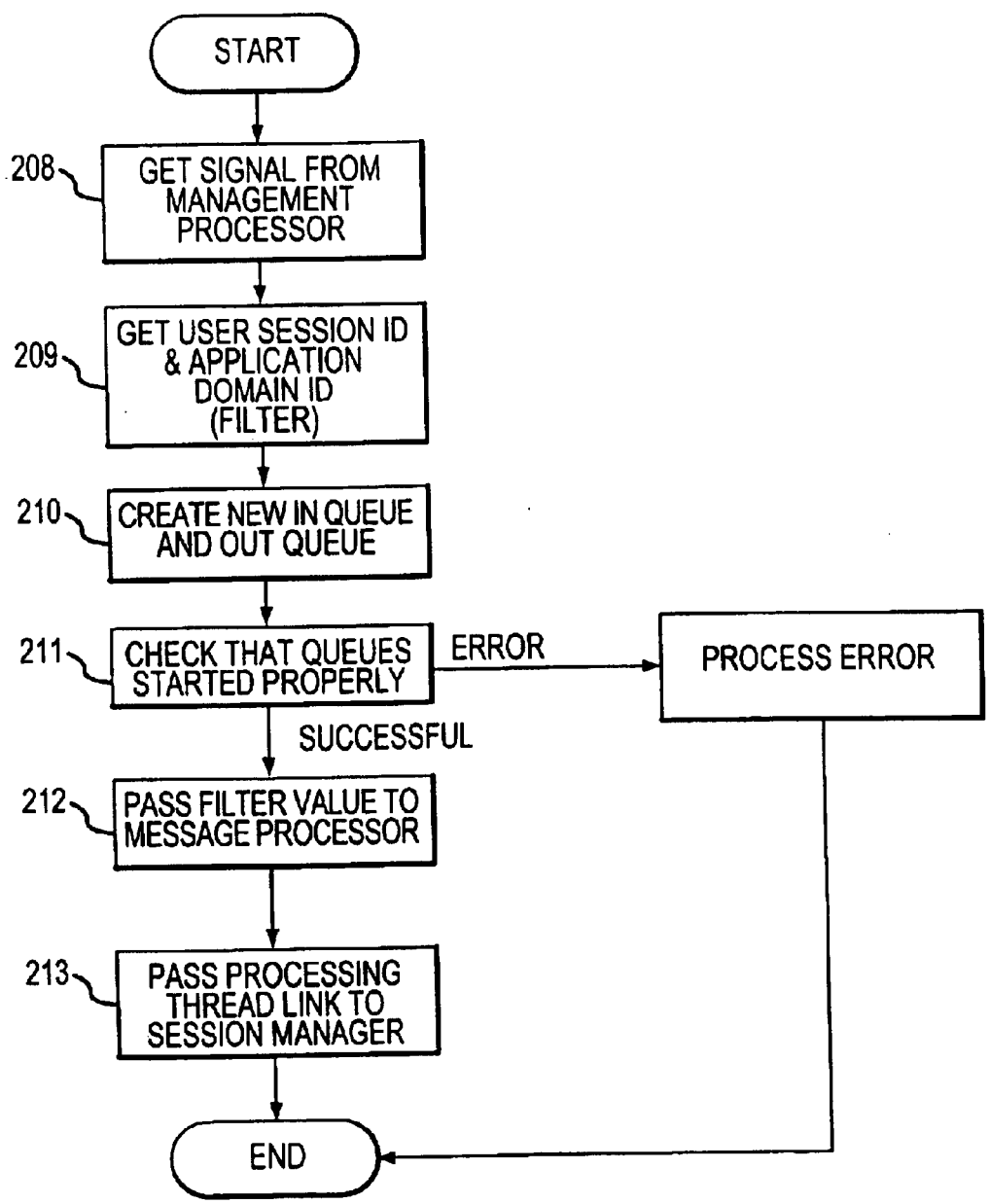
FIG. 12 illustrates an example of logical operations to initialize a processing thread—of either a multicasting engine or a listening device.
Figure 13:
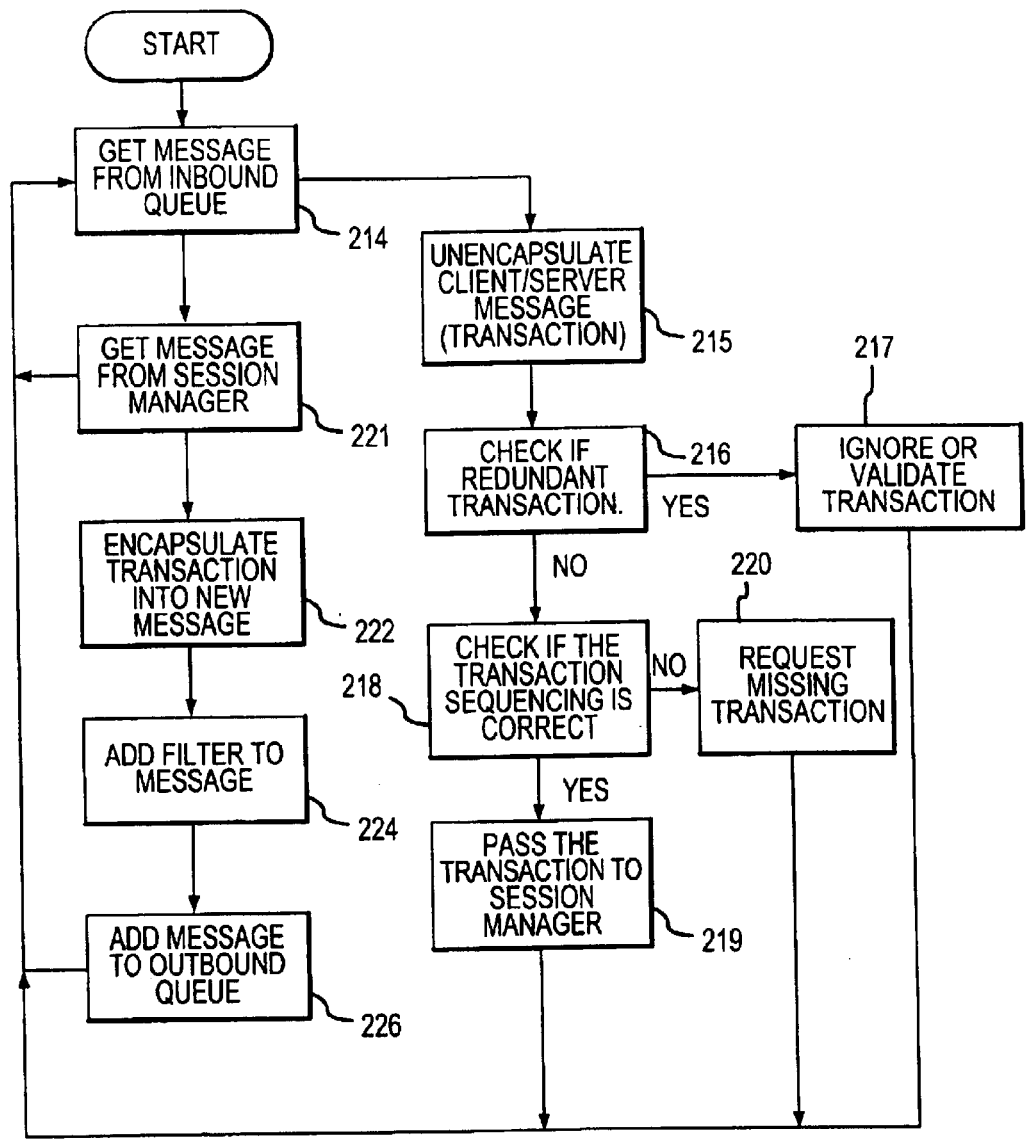
FIG. 13 illustrates an example of logical operations performed by one or more processing threads of a multicasting engine.

The processing threads 96A, 96B of the multicasting engine 80 of the embodiment of FIG. 4A are generally responsible for processing the messages or data in the inbound 92A, 92B and outbound queues 94A, 94B associated with the processing thread. Various operations of the processing threads are illustrated in FIGS. 12 and 13.

In the example of FIG. 4A, two processing threads are illustrated—processing thread X (96A) and processing thread Y (96B). In this example, processing thread X corresponds to a user session with client X, and processing thread Y corresponds to a user session with client Y. The multicasting engine 80 communicates with the user devices through communications interface 99, in one example, which may support various protocols such as TCP/IP, NCP, NetBios or others. Accordingly, a single multicasting engine 80 is capable of handling multiple user sessions from a plurality of clients.

Referring now to FIG. 4B, a block diagram of two embodiments of listening devices 82A, 82B is illustrated. In FIG. 4B, each listening device has a message processor 100, a management processor 102, and a session manager 104. A port communications interface 105 may also be provided to communicate with its respective server and may use a media card, sockets, pipes, object linking and embedding (OLEs), application program interfaces (API's), or direct memory, depending on the implementation and the connections therebetween which may include TCP/IP, system network architecture (SNA), direct coupling, SCSI, or Fibre channel, or other communication links.

Each listening device also has one or more processing threads 106A, 106B, or 106C having inbound queues 108A, 108B, 108C and outbound queues 110A, 110B, 110C associated therewith. A general queue 112 is also provided for these embodiments of the listening devices 82A, 82B.

As shown in FIG. 4B, listening device 82A is shown as having processing threads X (106A) and Y (106B), while listening device 82B is shown having processing thread X (106C). Accordingly, it can be seen that requests from client X are being handled as processing thread X in two separate listening devices 82A, 82B having two separate and independent servers 114, 116, respectively, associated therewith, in accordance with one embodiment of the present invention, so as to provide continuous operations independent of device failure or disaster of one of the servers 114, 116.

Figure 15:
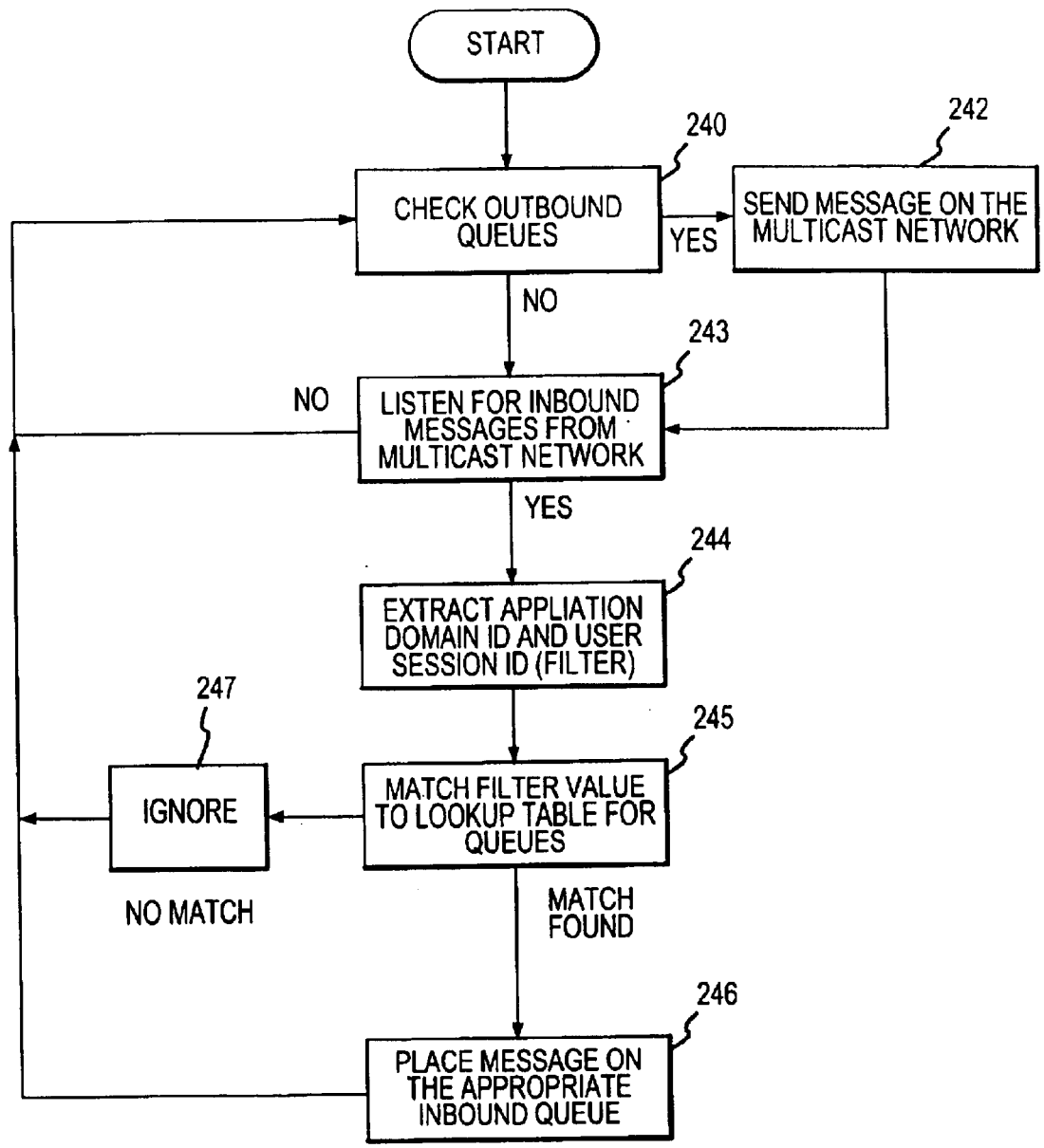
FIG. 15 illustrates an example of logical operations performed by a message processor module of a listening device.

The message processors 100 shown in the embodiment of FIG. 4B are each responsible for transmitting messages from the respective listening device 82A, 82B to the multicasting engine 80, and receiving a message from the multicasting engine 80 to be passed to the appropriate queue within the particular listening device 82A, 82B. Various operations of one embodiment of a message processor of a listening device are illustrated in FIG. 15.

Figure 16:
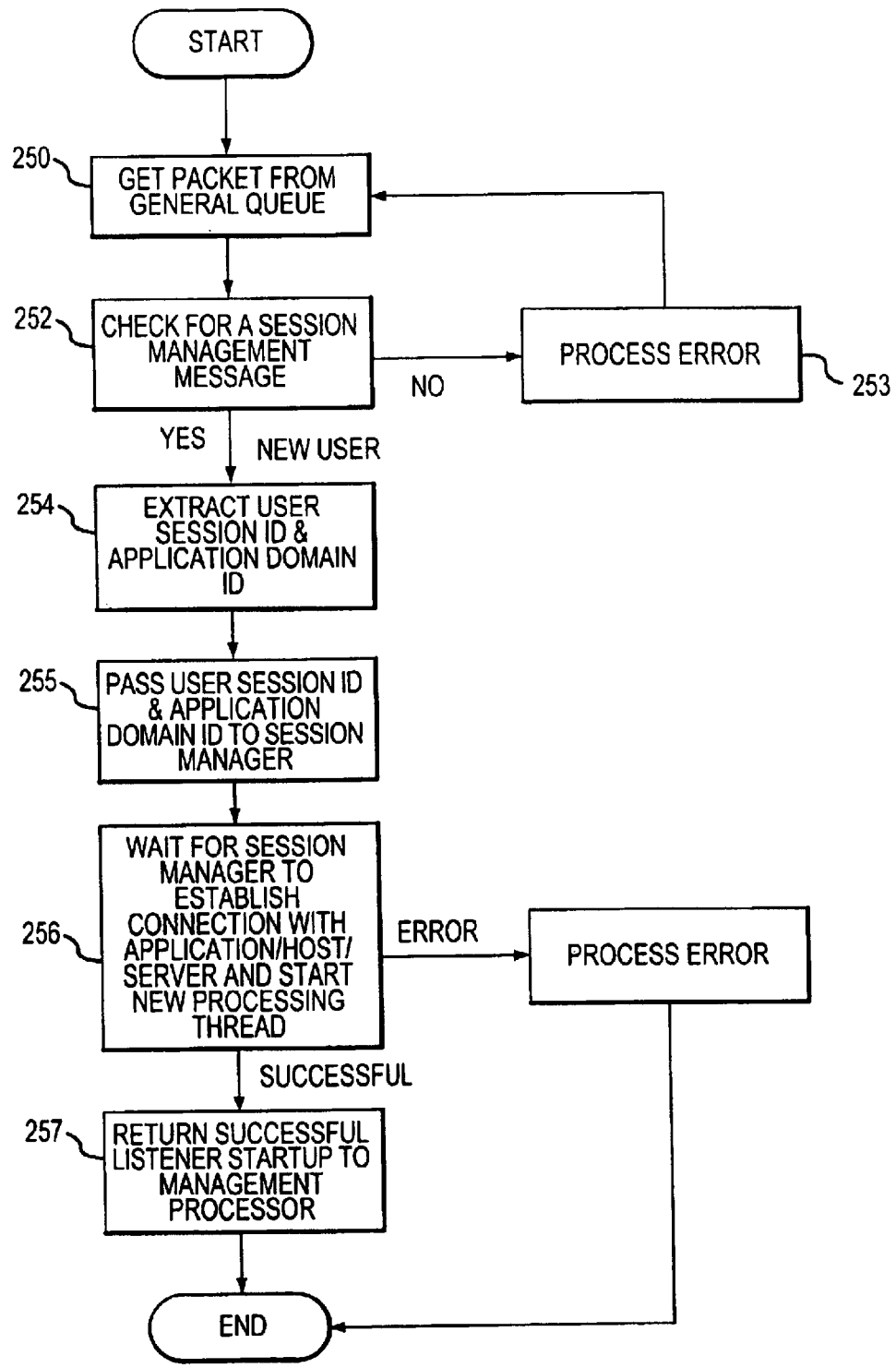
FIG. 16 illustrates an example of logical operations performed by a management processor module of a listening device.

The management processor 102 of a listening device 82A, 82B of the embodiments of FIG. 4B is generally responsible for creating and maintaining user sessions within the listening device. Various operations of one embodiment of a management processor 102 are illustrated in FIG. 16.

Figure 17:
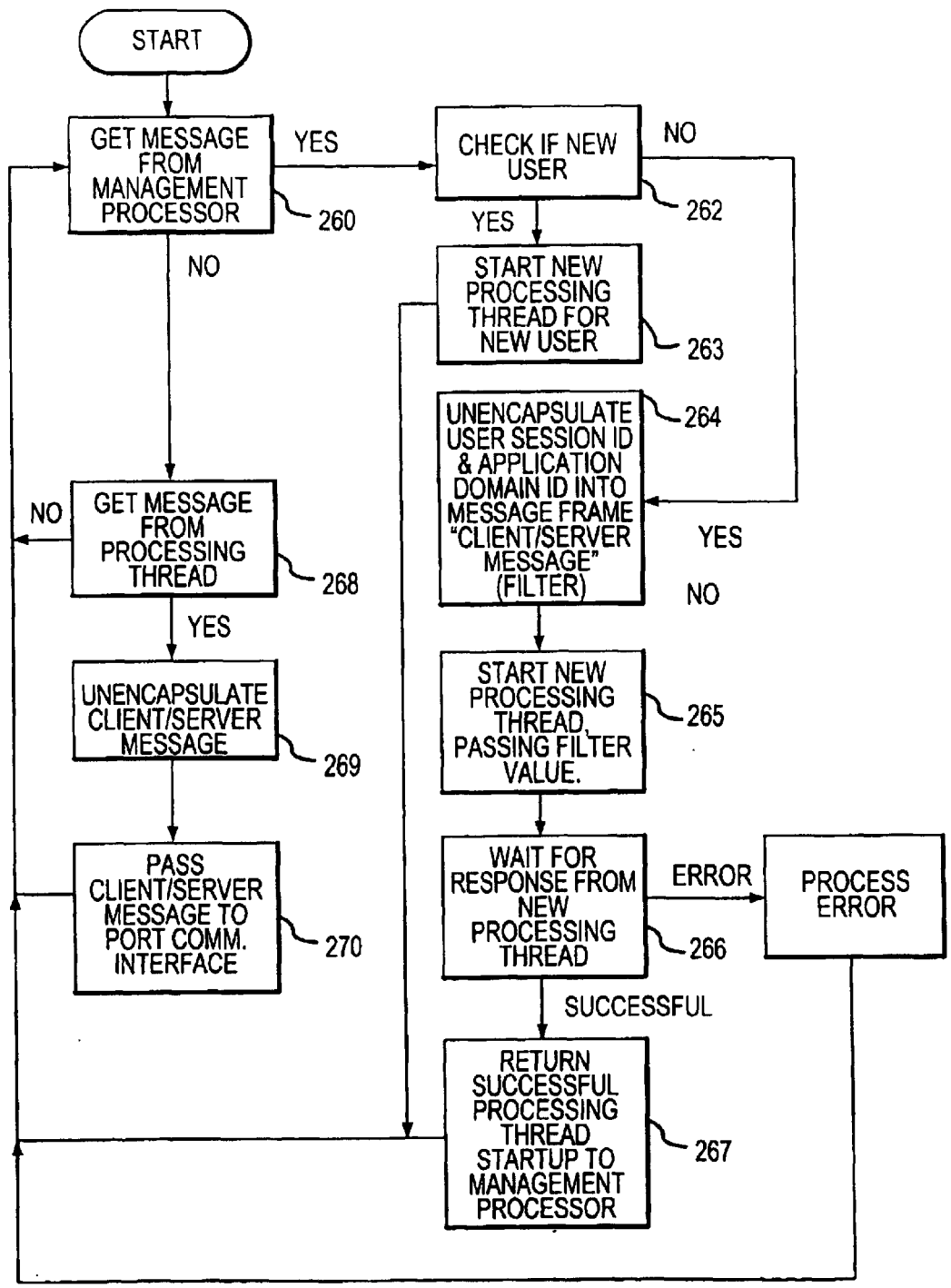
FIG. 17 illustrates an example of logical operations performed by a session manager module of a listening device.

The session manager 104 of a listening device shown in the embodiment of FIG. 4B is generally responsible for managing the processing threads associated with the user sessions to be handled within the listening device 82A, 82B. Various operations of one embodiment of a session manager 104 of a listening device are illustrated in FIG. 17.

Figure 5:
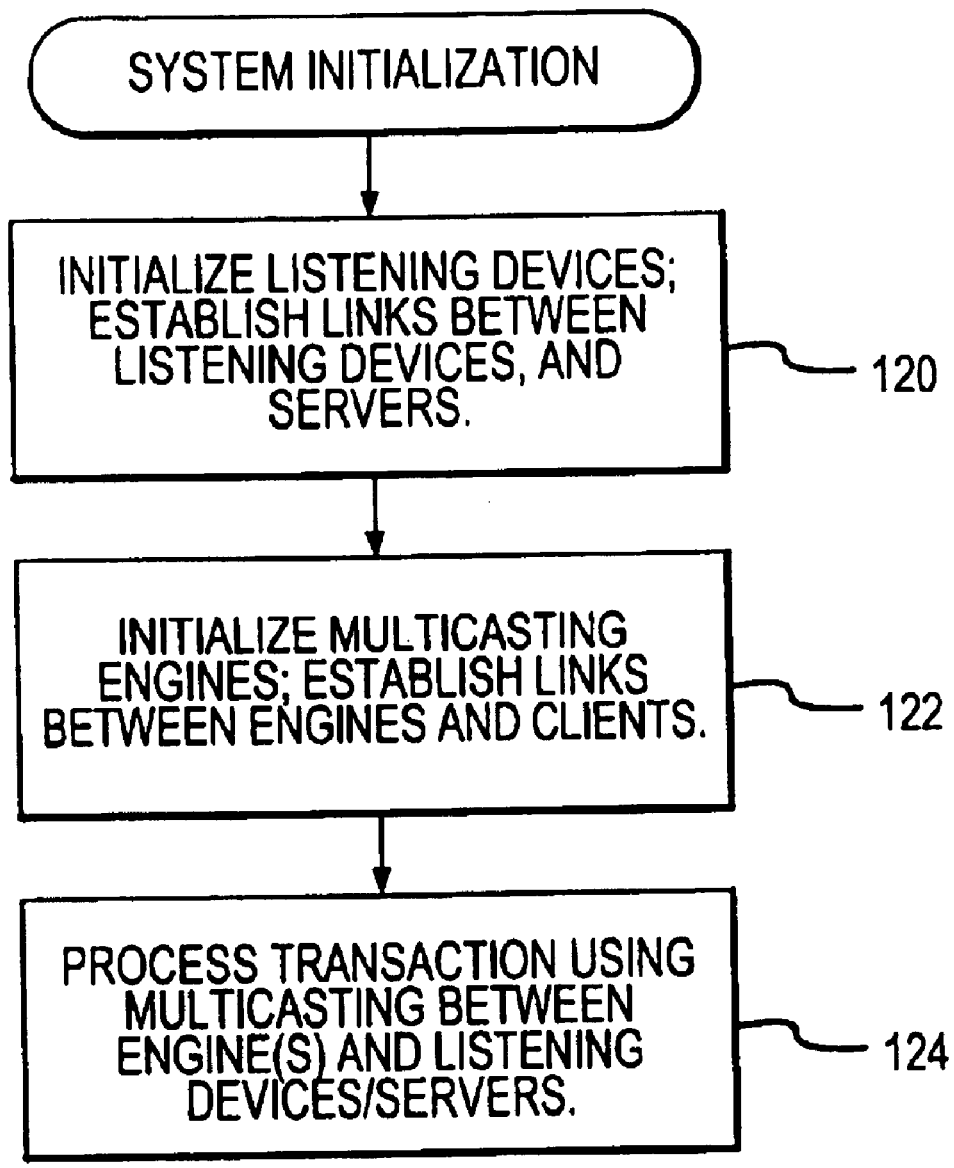
FIG. 5 illustrates a flow diagram of an example of system operations.

Referring to FIG. 5, an example of operations, such as for the system shown in FIGS. 4A and 4B, is illustrated in accordance with one embodiment of the present invention. In operation 120, the listening devices are initialized. In one embodiment, links are established between the listening devices and their respective servers. For example, in FIG. 4B, listening device 82A establishes its link to server 114, and listening device 82B establishes its link with server 116. At operation 122 of FIG. 5, the multicasting engines are initialized. In one embodiment, after the multicasting engine has been initialized, links may be established between the multicasting engine and one or more clients that will be serviced by the engine. Having initialized both the listening devices and the engines, at operation 124, client transactions or requests are processed using multicasting transmissions between the engines and the listening devices (and their respective servers). As described above in one embodiment, for each user request or transaction, a multicasting engine effectively transmits the user request to at least 2 listening devices, each listening device having a server associated therewith capable of processing the request or transaction. Each server independently and completely processes the request and a result is returned by the listening device to the multicasting engine, which passes the results received from one of the listening devices to the appropriate client. In this manner, embodiments of the present invention provide for continuous and uninterrupted user sessions in the event of failure or unavailability of a single server.

Figure 6:
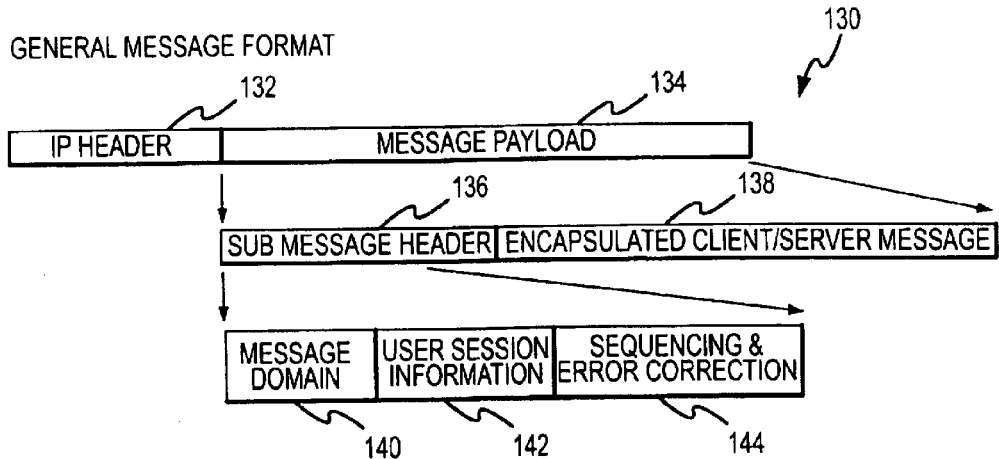
FIG. 6 illustrates a diagram of an example of a message format.
Figure 7:
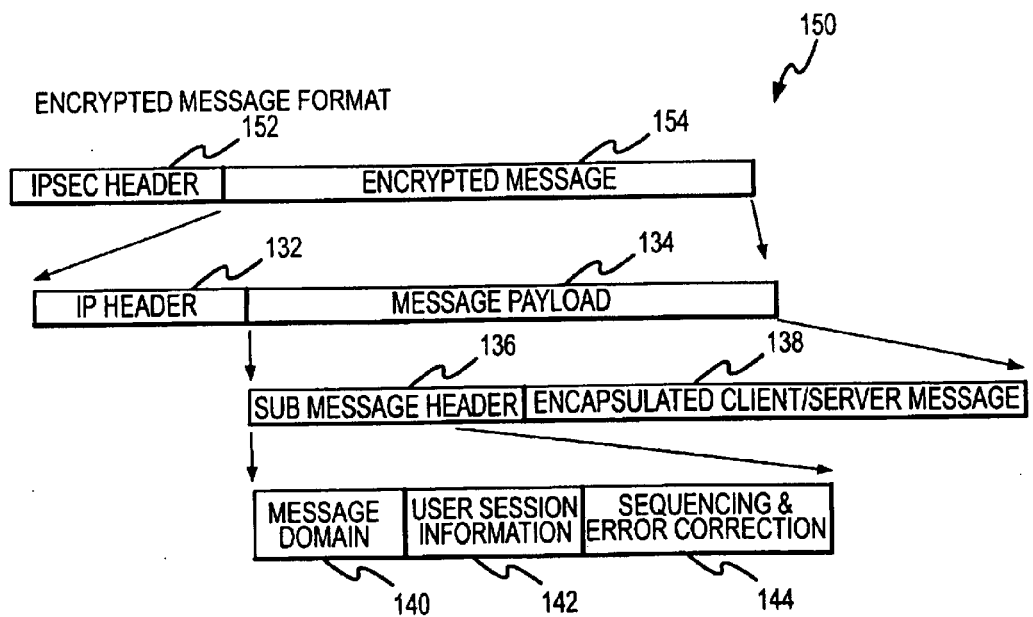
FIG. 7 illustrates a diagram of an example of a message format for encrypted messages.

Referring to FIGS. 6 and 7, examples of message formats are shown. In one embodiment, messages 130 are encoded using IP message formats, which generally have a header portion 132 and a payload portion 134. In one embodiment, within the Payload 134, a sub-header 136 is encoded along with an encapsulated client/server message 138. The sub-header 136 includes, in one embodiment, a field 140 for a message domain, a field 142 for user session information, and a field 144 for sequencing and error correction. As will be discussed further below, the message domain information 140 (which may include an application domain identification identifying a particular application or set of applications) and the user session information 142 are utilized as a filter so that the various components or modules of the multicasting engine and listening device can quickly and easily determine whether a message received is intended to be processed by a particular multicasting engine or listening device as appropriate. The sequence number may be a unique number used as a transaction number, or the sequence number may be mapped to a transaction number which is generated by a third-party system. As shown in FIG. 7, a similar message format 150 may be utilized with conventional IP encryption techniques, such as utilizing the secure and encrypted IP headers 152 and encrypted message payloads 154.

The operations of one embodiment of a multicasting engine 30 will be described with reference to FIGS. 8–13. These operations may be used in conjunction with the multicasting engine 80 shown in FIGS. 4A and 4B, or with other embodiments or implementations as desired.

Figure 8:
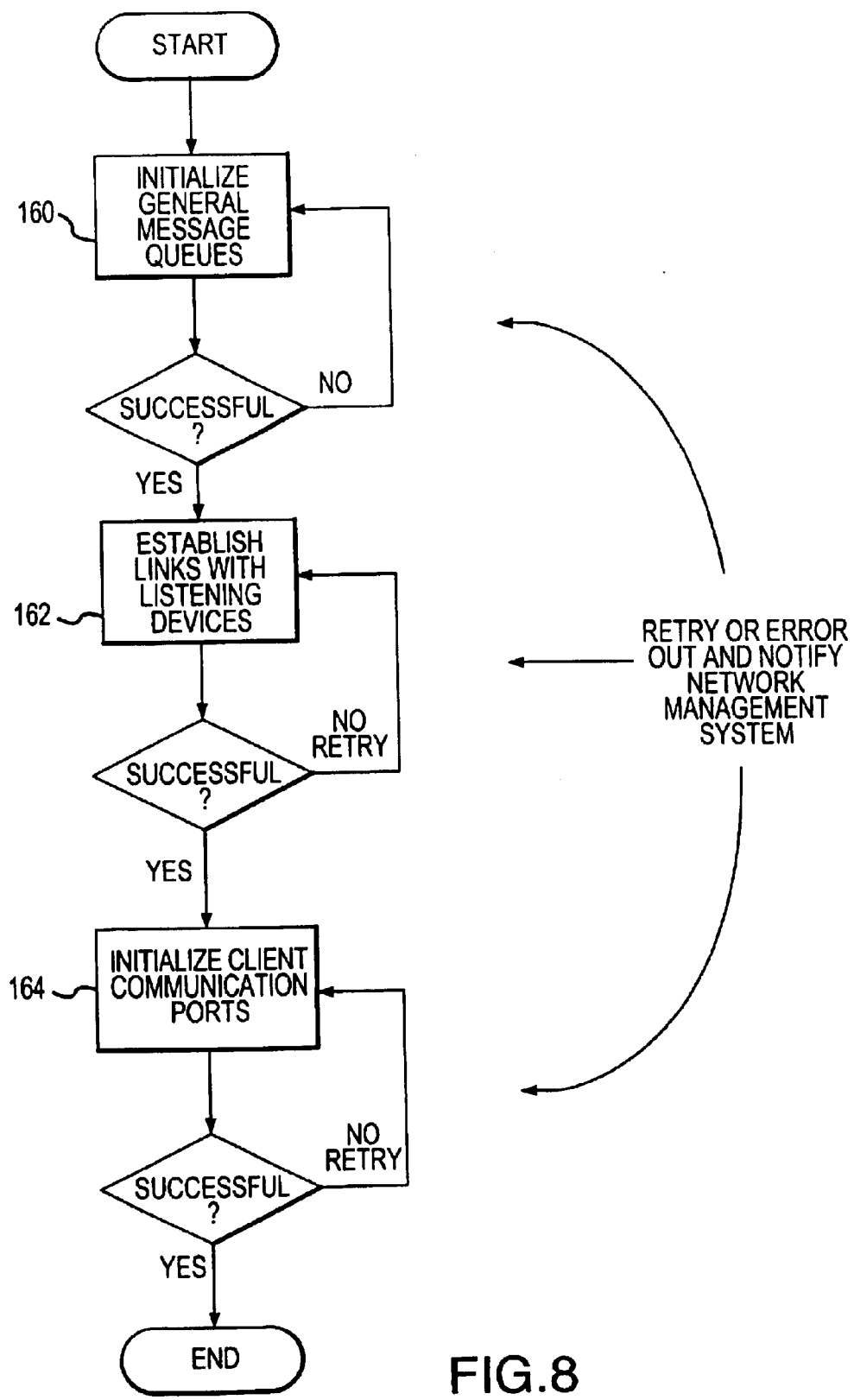
FIG. 8 illustrates an example of logical operations for initializing a multicasting engine.

Referring to FIG. 8, at operation 160, the general message queues 90 of the multicasting engine are initialized. At operation 162, links between the multicasting engine 80 and the listening devices 82A, 82B are established. At operation 164, the communication ports 99 used to communicate with the client devices 98 are initialized. In one embodiment, if any of the operations 160–164 fail, the operations may be re-tried or an error may be generated and the network management system associated with the multicasting engine 30 may be notified of the error.

Referring to FIG. 9, at operation 170, the session manager 84 (FIG. 4A) starts by listening for packets from a communication port 99 of the engine 80. If a packet is received on a port 99, then operation 172 determines if the packet corresponds to a new user session. In one embodiment, operation 172 checks a port ID (or socket identification) (see FIG. 27) of the received packet and if the port ID is not already listed in a table maintained within the engine, then the received packet corresponds to a new user session. If the packet does not correspond to a new user session, then at operation 173, the packet is passed to an established processing thread (i.e., 96A or 96B) for handling the data for the respective user session.

Otherwise, the packet corresponds to a new user session and operation 174 establishes a new port number (i.e., a virtual port number or a socket number) for handling future packets associated with this client session. Operation 175 creates a user session ID and application domain ID corresponding to this new user session. As will be explained below, the user session ID and the application domain ID established at operation 175 are utilized by other components or modules of the system to encode messages for transmission, and conversely for filtering and decoding messages. At operation 176, the user session ID and the application domain ID are passed to the management processor 86 of the multicasting engine 80, which will request that a thread at a listening device (i.e., 82A, 82B) be spawned to handle this particular user session. In one embodiment, at least two threads are spawned per user session, a first thread at a first listening device associated with a first sever capable of supporting the user session, and a second thread at a second listening device associated with a second sever capable of supporting the user session. For example, as shown in FIG. 4B, listening device 82A has a processing thread X (106A) and listening device 82B also has a processing thread X (106C).

Operation 177 waits to receive confirmation from the management processor 86 that remote listening devices (i.e., 82A, 82B) are ready to accept messages from the multicasting engine 80 relating to this user session. Once confirmation is received, operation 178 starts a new processing thread 96A in the multicasting engine 80 corresponding to the user session, and operation 179 passes the thread information, as well as the user session information in one embodiment, to the communication port 99 for entry into the table described with reference to operation 172.

The session manager 84 may also receive data from a processing thread (i.e., thread 96A or 96B) for transmission out to a client device. At operation 180, a packet or data is obtained from a processing thread (i.e., 96A or 96B) of the engine 80, and in one example operation 181 unencapsulates the packet or data from the processing thread to strip it of the sub-header information (see FIGS. 6 and 7) so that the message is in a standard format that the client device would be capable of decoding, such as traditional IP message formatting. Operation 181 transmits the data to the client through the communication port 99.

FIG. 10 illustrates an example of logical operations performed by an embodiment of a management processor of a multicasting engine. These operations will be explained with reference to FIGS. 4A and 4B, although these operations may be used in other embodiments as well. In FIG. 10, at operation 190, the management processor 86 receives a packet from the session manager 84, and at operation 192, the management processor 86 extracts the filter information including, in one embodiment, the user session ID and the application domain ID. At operation 193, the management processor 86 forms a message to be sent to and to be processed by at least two listening devices with servers (i.e., listening devices 82A, 82B with servers 114, 116) associated therewith, the message including the user session ID and the application domain ID in the message frame portion of the payload, shown as the "client/server message" portion 138 in FIGS. 6 and 7. At operation 194, the management processor 86 places a "management" application domain ID value in the "message domain" field 140 of the sub-message header 136 of the message (see FIGS. 6 and 7). At operation 195, the management processor 86 places the message on the general queue 90, and the message processor 88 of the multicasting engine 80 then transmits the message over a network to the listening devices (i.e., 82A, 82B). Operation 196 waits for a response from the listening devices, and if a successful response is received, then operation 197 returns a "successful start up" message to the session manager 84 of the multicasting engine 30 (see operation 177 of FIG. 9).

FIG. 11 illustrates an example of logical operations performed by an embodiment of a message processor 88 of a multicasting engine 80. These operations will be described with reference to FIGS. 4A and 4B, although these operations may be used in other embodiments as well. In FIG. 11, at operation 200, a message processor 88 checks the outbound queues (i.e., 94A, 94B) for messages to be transmitted to listening devices. If a message exists in an outbound queue, then at operation 202 the message processor 88 sends the message over a multicast network to the appropriate listening devices (i.e., 82A, 82B). If there are no messages in the outbound queue of the engine 80, then operation 203 listens for inbound messages received from the listening devices. For each message received from a listening device, operation 204 extracts the filter information, including in one embodiment the application domain ID and the user session ID, and operation 205 attempts to match the filter values to values contained within a look-up table for the inbound queues maintained in the engine 80. If no match is found, then operation 206 ignores the message. If a match is found, then operation 207 places the received message in the appropriate inbound queue (i.e., 92A, 92B) for processing by the respective processing thread (i.e., 96A or 96B) (see FIG. 13).

FIG. 12 illustrates various operations for initializing a processing thread, and these operations may be utilized to start a processing thread in either a multicasting engine, such as engine 80, or a listening device, such as 82A, 82B. These operations will be described with reference to FIGS. 4A and 4B, although the operations may be used in other implementations as well. At operation 208, a signal is received from a management processor (i.e., 86 or 102) to start or initialize a processing thread (see, for example, FIG. 9, operation 178, FIG. 10 operation 195). At operation 209, the filter information including the user session ID and the application domain ID are obtained. Operation 210 creates the client session queues, including in one embodiment an inbound queue and an outbound queue (such as 92A, 108A, 110A) corresponding to this processing thread. Operation 211 determines whether the queues have been started properly (i.e., checking for memory errors) and if successful, operation 212 passes the filter value to the message processor (i.e., 88 or 100) so that the message processor can associate the filter value with this particular processing thread. Operation 213 passes the processing thread link to the session manager (i.e., 84 or 104) so that the session manager is made aware of the existence of the processing thread.

FIG. 13 illustrates examples of logical operations of a processing thread of a multicasting engine. These operations will be described with reference to FIGS. 4A and 4B, although the operations may be used in other implementations as well. In FIG. 13, a processing thread (i.e., 96A or 96B) of the multicasting engine 80 at operation 214 receives a message from the inbound queue (i.e., 92A or 92B). If the message is from a listening device to be transmitted to a client, then operation 215 unencapsulates the message so that a message, using conventional data formats in one embodiment, can be transmitted to the appropriate client device. Operation 216 determines whether the message received is redundant—meaning that the message received has already been received from another listening device.

As described herein, each server processes a computing request independently and completely, and stores in its local persistent storage device whatever data or result is obtained from its performance of the requested operation. Since each server asynchronously returns the result to the multicasting engine, the multicasting engine will, under normal operations, receive more than one result and the results will likely be identical. Further, in one embodiment, the multicasting engine sends a new request to a server only after the server has provided the multicasting engine with the result from the prior request. In this manner, the inbound and outbound queues maintained by the multicasting engine 80 permit servers that are slower to respond to the request to still perform and complete their operations before the multicasting engine will send a new request to these servers. Hence, the state of each application running on each server is properly maintained, while the user receives the first result generated by one of the servers.

Hence, at operation 216, if the message received by a processing thread is redundant, then operation 217 ignores the message or alternatively performs some validation function on the data received by comparing the data received to the data previously received from another listening device. The multicasting engine 30 may be provided with logic to examine and compare the results received from the servers in order to determine if a server has malfunctioned, become inoperable, lost its network connection, or has otherwise become problematic.

If the message received is not redundant, then operation 218 determines if the transaction sequencing is correct by examining the sequence number (see 144 of FIGS. 6 and 7) included in the sub-message header 136 of the message. If the sequencing is correct, then the data from the message (excluding any encapsulation in one example) is passed at operation 219 to the session manager 84 for transmission to the appropriate client device 98. If, however, the sequencing is incorrect, then operation 220 may re-request any missing transactions from the listening devices so that these transactions may be processed by the processing thread and transmitted to the appropriate client device in their proper order.

If at operation 214 a message in an inbound queue is from a client device 98, then operation 221 retrieves the message from the session manager 84 and operation 222 encapsulates the message into a new message including, at operation 224, the appropriate filter information (user session ID/application domain ID). Operation 226 adds the encapsulated message to the outbound queue (i.e., 94A, 94B) of the processing thread (i.e., 96A, 96B) so that the message can be multicast/transmitted to multiple listening devices.

Figure 14:
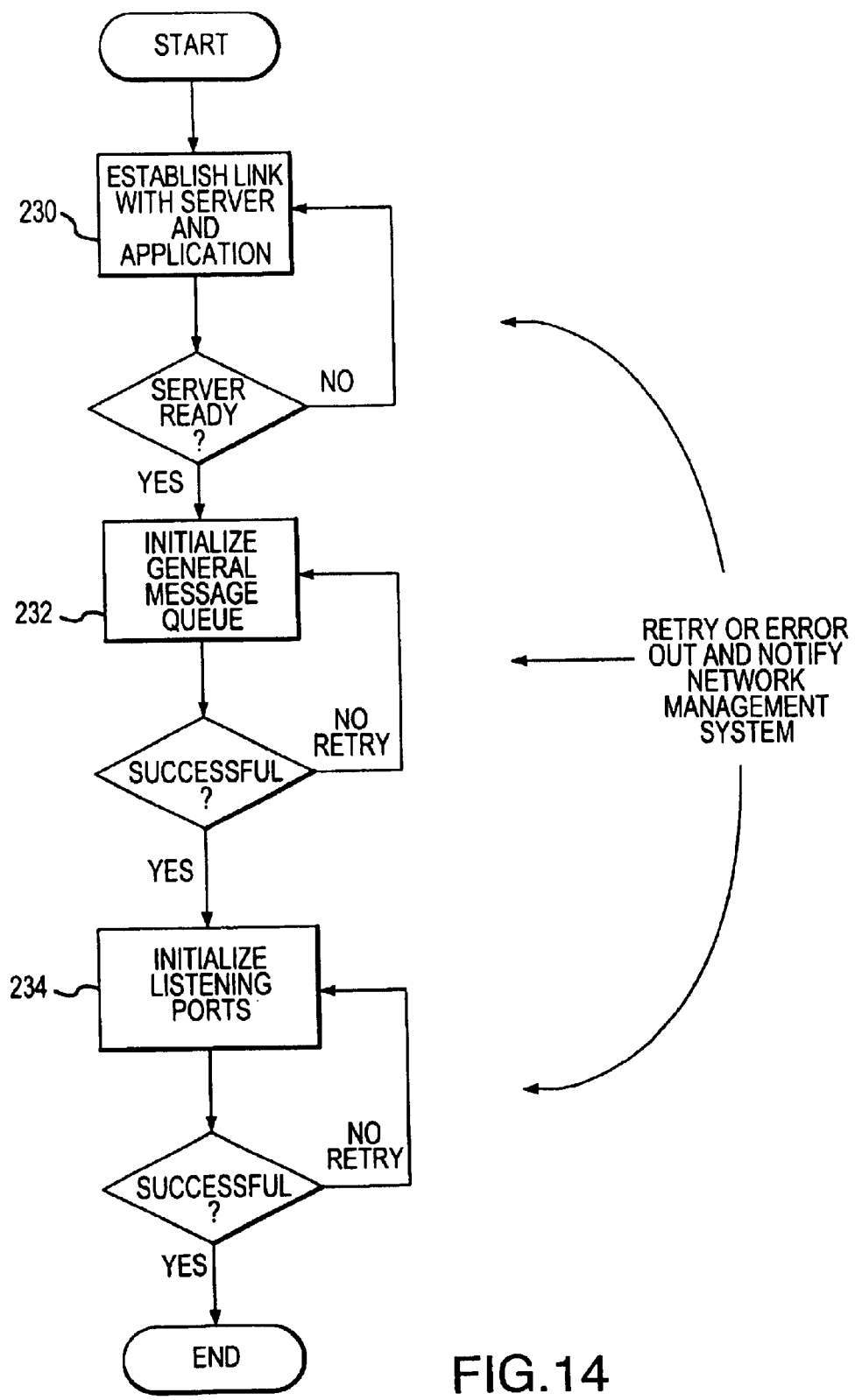
FIG. 14 illustrates an example of logical operations for initializing a listening device.

FIGS. 14–18 relate to operations performed by a listening device, in accordance with one embodiment of the present invention. FIG. 14 illustrates examples of logical operations to initialize a listening device, and will be described with reference to FIGS. 4A–4B although these operations may be used in other implementations. In FIG. 14, operation 230 establishes a link between a listening device and its respective server, as well as with the applications that are resident on the server. Operation 232 initializes the general message queue 112 for the listening device, and in operation 234, the communication ports of the listening device are initialized for communicating with one or more multicasting engines. If any of the operations 230–234 are unsuccessful, then the operations may be re-tried or an error message may be sent to the network management system.

FIGS. 15–18 relate to various operations performed by components or modules of a listening device, in accordance with one embodiment of the present invention. FIG. 15 illustrates examples of operations that may be performed by a message processor, and will be described with reference to FIGS. 4A–4B although these operations may be used in other implementations as well. In FIG. 15, operation 240 checks the outbound queues (i.e., 110A, 110B, 110C) to determine whether there are any messages stored therein that should be transmitted to the network. If so, then at operation 242, the message processor 100 transmits the message over the multicast network to the appropriate engine to which the message corresponds. If operation 240 determines that the outbound queues are empty, then at operation 243, the message processor 100 listens for inbound messages received from multicasting engines. If there are no inbound messages received from any engines, then control is passed to operation 240, in one embodiment. If operation 243 determines that an inbound message has been received, then operation 244 extracts the filter information from the message, including, for example, the application domain ID and the user session ID. Operation 245 matches the filter value extracted at operation 244 to a processing thread (i.e., 106A, 106B, 106C) operating within the listening device, and if a match is found, then operation 246 passes the message onto the appropriate inbound queue associated with the processing thread match by operation 245. If operation 245 determines that the filter value does not correspond to any processing threads presently operating in the listening device, then operation 247 ignores the message and control is returned to operation 240.

FIG. 16 illustrates examples of logical operations performed by a management processor of a listening device, and will be explained with reference to FIGS. 4A–4B although these operations may be used in other implementations as well. Referring to FIG. 16, at operation 250, the management processor 102 retrieves a packet from the general message queue 112. Operation 252 examines any message in the queue to determine whether the message is a session management message containing a request to initiate a new user session. If the message does not relate to establishing a new user session, then control is passed to operation 253, which processes the management message. Examples of such management messages processed at operation 253 include status request messages for requesting that the management processor report which threads are active within the listening device, in one example. If operation 252 determines that the message is a request to establish a new user session, then control is passed to operation 254, which extracts the user session ID and application domain ID associated with the new user session. Operation 255 passes this information to the session manager 104 so that the session manager 104 can establish a connection with the server with regard to the particular application associated with the application domain ID. At operation 256, the management processor 102 waits for the session manager 104 to start a new processing thread once the session manager 104 has established a connection with the server associated with the listening device. If the session manager 104 was successful in starting a new processing thread, then operation 257 returns a notification of a successful start-up of a listening device thread associated with the new user session.

FIG. 17 illustrates examples of operations performed by a session manager, and will be described with reference to FIGS. 4A–4B, although these operations may be used in other implementations as well. In FIG. 17, at operation 260, the session manager 104 checks to see if a message has been received from the management processor 102. If so, then operation 262 determines whether the message is a request for a new user session and, if so, operation 263 starts a new processing thread for a new user session, and control is returned to operation 260.

If operation 262 determines that the message is not a request for a new user session, then operation 264 unencapsulates the filter information contained within the message—for example, the user session ID and the application domain ID—and operation 265 starts a new processing thread to be associated with the filter value obtained at operation 264. Operation 266 waits for a response indicating the successful creation of the new processing thread and upon such successful creation, operation 267 returns a message to the management processor 102 indicating that the thread was successfully started.

If there are no messages at operation 260 from the management processor 102, then operation 268 retrieves any messages from any of the processing threads that are active within the listening device. If such messages exist, then operation 269 unencapsulates the payload portion of the message, and operation 270 passes the payload portion (shown as the "client/server" portion in FIGS. 6 and 7) to the communication port for transmission from the listening device to a multicasting engine.

Figure 18:
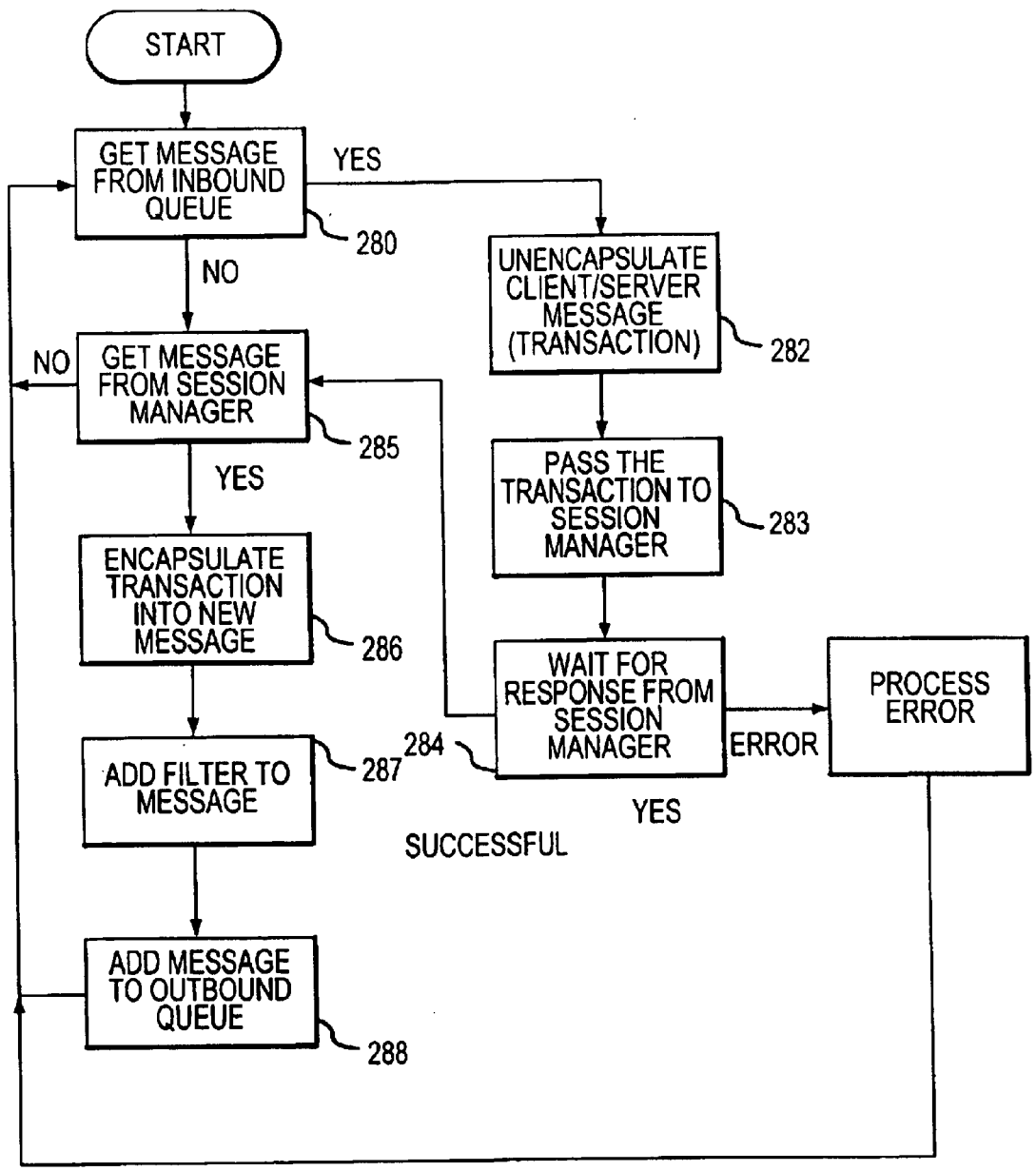
FIG. 18 illustrates an example of logical operations performed by one or more processing threads of a listening device.

FIG. 18 illustrates examples of logical operations for a processing thread of a listening device and will be explained with reference to FIGS. 4A–4B, although these operations may be used in other implementations as well. In FIG. 18, a processing thread gets a message from an inbound queue (i.e., 108A, 108B, 108C) associated with the processing thread, at operation 280. Operation 282 unencapsulates the message so as to extract the "client/server" payload portion of the message. Operation 283 passes the payload (also referred to as the transaction portion of the message) to the session manager 104, and operation 284 waits for a response from the session manager 104. If a successful response is received, then control is passed to operation 285.

If at operation 280 there are no messages in the inbound queue, then operation 285 determines whether there are any messages for the processing thread from the session manager. If not, then control is returned to operation 280. If operation 285 determines that there are messages for the processing thread from the session manager, then operation 286 encapsulates the data from the message into a new message to be transmitted out to the appropriate multicasting engine 80. Operation 287 adds the filtering information (i.e., the application domain ID and the user session ID) to the message, and operation 288 adds the formed message to the outbound queue for transmission to the appropriate multicasting engine 80.

Figure 19:
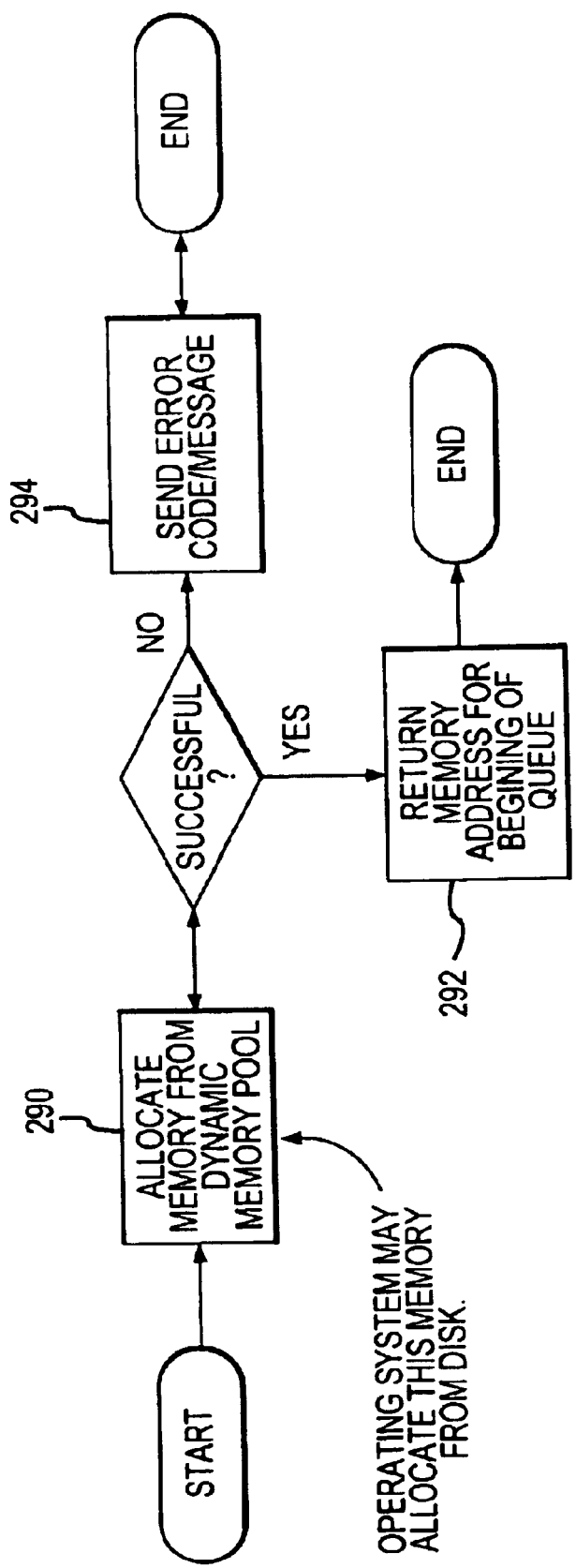
FIG. 19 illustrates an example of logical operations for initializing a queue in memory.

FIG. 19 illustrates the general operations for creating and initializing a queue in memory, and may be used for creating a general queue or a inbound or outbound queue of a processing thread, in accordance with one embodiment of the present invention. At operation 290, memory is allocated from a dynamic memory pool, and if this operation is successful, then at operation 292 the memory address for the beginning of the queue is returned to the process that requested the queue initialization. In this manner, the module which requested the creation of the queue now has a memory address range for use in maintaining a queue of, for instance, messages or other pieces of data. If operation 290 is unsuccessful, then operation 294 may return an error message indicating that the request for the creation of a queue was unsuccessful.

FIG. 27 illustrates an example of a table or data structure which may be used by a multicasting engine to map a user device or server with a corresponding processing thread. In FIG. 27, the table may be used to map elements such as an address (i.e., an IP source address), a Socket identification (that, for example, identifies a physical or virtual port of the multicasting engine upon which the data was received) and a processing thread identification or address for a thread operating in the multicasting engine. In this manner, when a message is received by a multicasting engine, the table may be used as a look-up table to determine to which processing thread, if any, within the multicasting engine the message corresponds. This table may be maintained as part of the port communications interface 99, or by other portions of the multicasting engine. Also, non-IP communication protocols may be supported as well.

FIGS. 28A–28B illustrate examples of tables which may be used by a message processor (either 88 of FIG. 4A or 100 of FIG. 4B) to determine if a message should be processed or ignored. In this regard, these tables may be used to "filter" or quickly examine a received message and determine how to proceed with the received message. In the table of FIG. 28A, a list of application domain identifications with their respective user session identifications and inbound queues is maintained, in one example. The application domain identifications in FIG. 28A are text based identifiers—such as an application domain identification of "Accounts Payable Voucher" which maps to a user session identification of "20" mapping to inbound queue X; or an application domain identification of "Accounts Receivable Adjustment" which maps to a user session identification of "23" mapping to inbound queue Y. In FIG. 28B, the application domain identifications may be numeric based. If a message processor determines that a received message contains an application domain identification which should be serviced, then the message processor can use the inbound queue information in the table to determine the proper inbound queue to place the data of the message.

Figure 20:
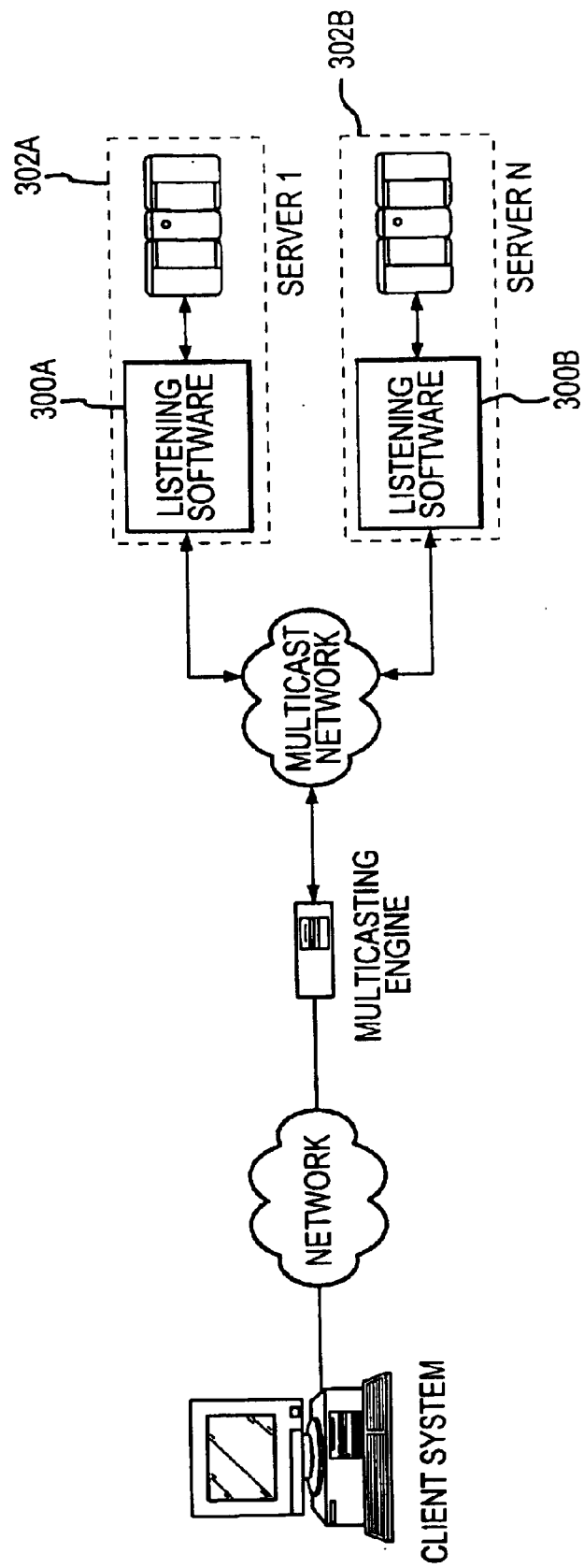
FIG. 20 illustrates an alternative embodiment for implementing a listening device, in accordance with one embodiment of the present invention.

FIGS. 20–24 illustrate alternative embodiments of the present invention. In FIG. 20, a listening device is embodied as one or more software modules 300A, 300B operating on a respective server device 302A, 302B with which the listening device is associated. In this sense, the listening devices described herein with reference to FIGS. 3, 4B, and 14–18 are embodied as software modules 300A, 300B operating on the respective servers 302A, 302B.

Figure 21:
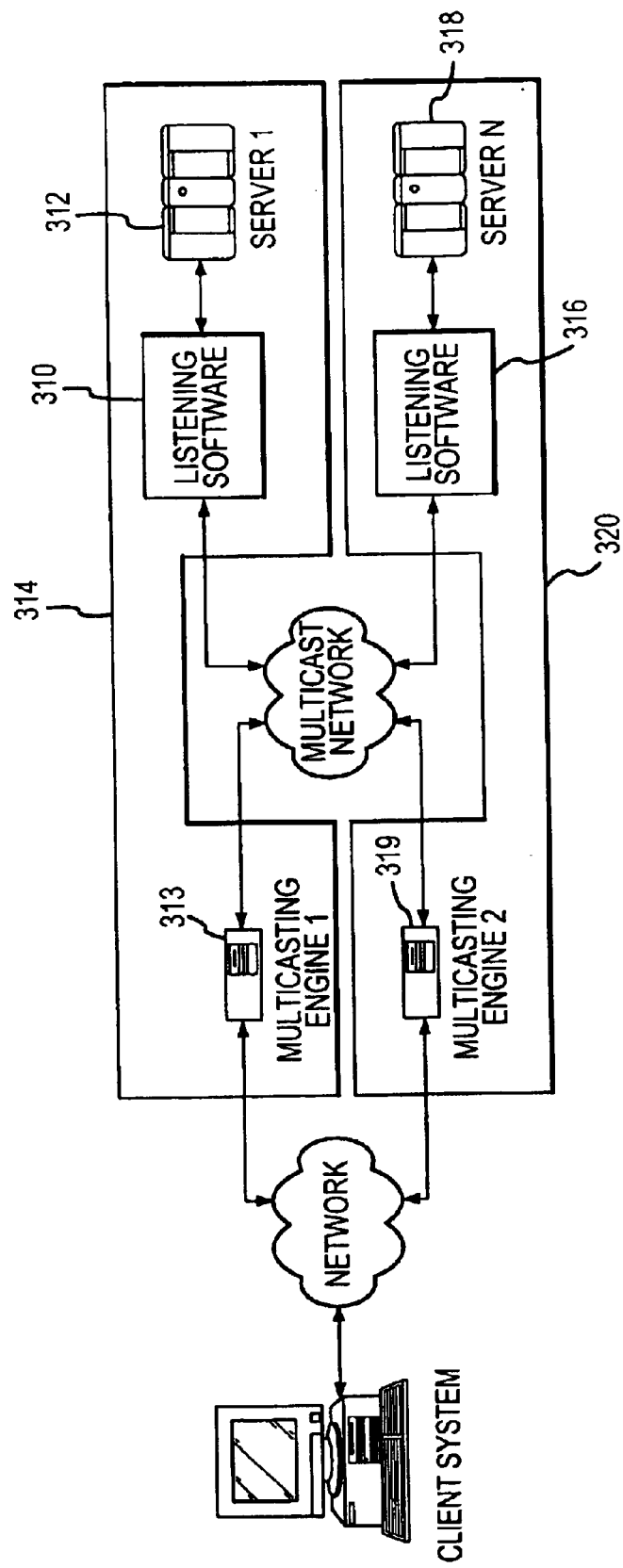
FIG. 21 illustrates a block diagram of one embodiment of a system, wherein a portion of the system is located at a client location and another portion of the system is located at a remote location.
Figure 22:
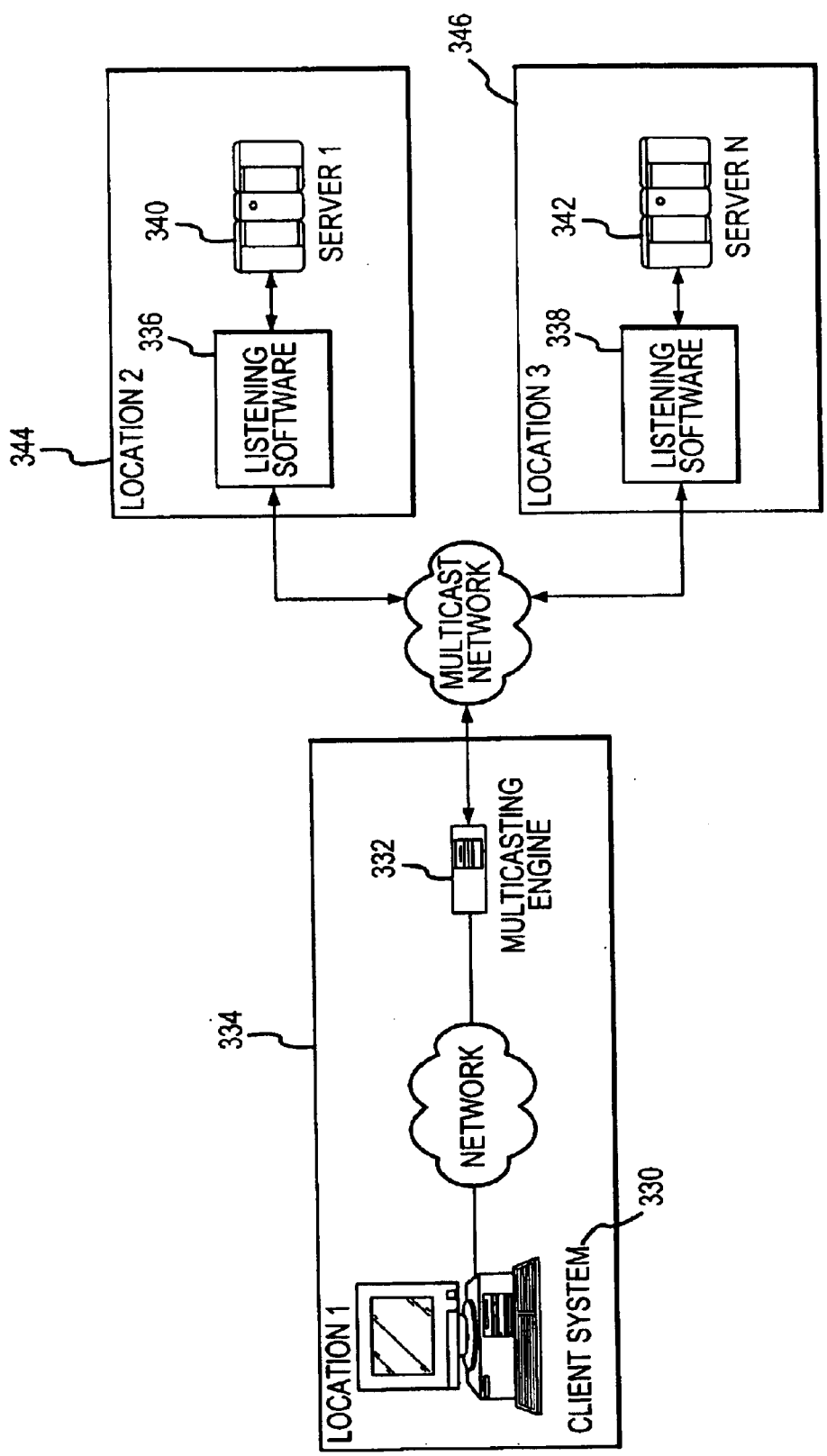
FIG. 22 illustrates a block diagram of another embodiment of a system, wherein the servers are located at different remote locations, in accordance with one embodiment of the present invention.

FIGS. 21 and 22 show different embodiments for positioning or locating the servers and other components of a system. In FIG. 21, a first listening device 310, server 312, and multicasting engine 313 may be located at a first location 314, such as the client site, for example, in a large corporation. In order to provide geographical separation, a second listening device 316, associated server 318, and multicasting engine 319 can be located at a data site 320, which is remote and geographically separated from the first location 314. In FIG. 22, the client system 330 and one or more multicasting engines 332 may be located at a first location 334, and each of the listening devices 336, 338 and associated servers 340, 342 may be located at different locations 344, 346, which are remote from the first location 334. Alternatively, multicasting engine 332 may be located at location 344, 346, or another location remote from location 334.

Figure 23:
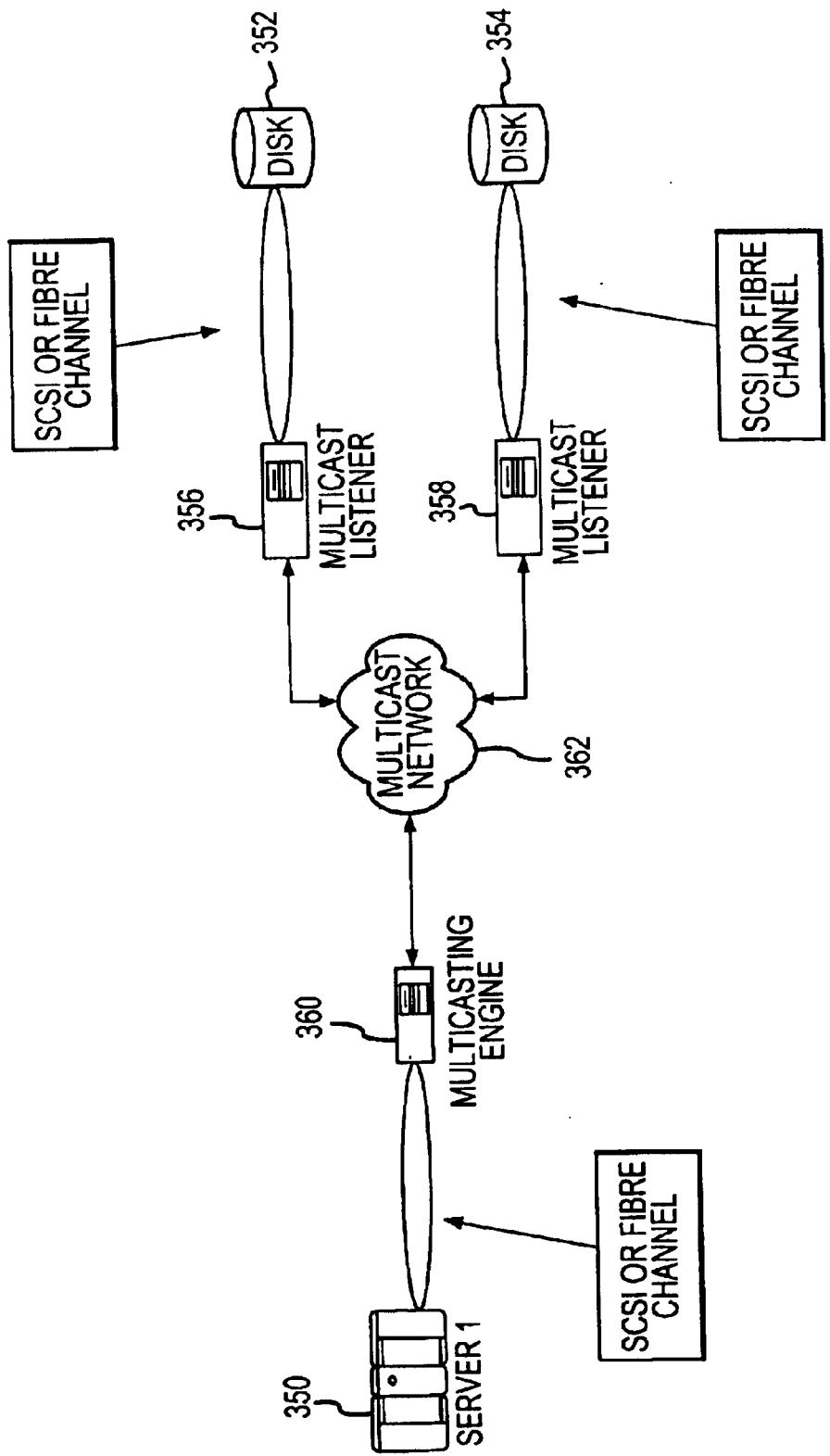
FIG. 23 illustrates an alternative embodiment of the present invention, wherein a multicasting engine and two or more listening devices are used to persistently write data to and read data from at least two storage devices, in accordance with one embodiment of the present invention.

The above described system and methods, in whole or in part, may also be implemented in a single location to improve the robustness of a computing system. Two or more servers may be provided, for instance, in a single rack to provide fault tolerant operations in the event of a device failure of one of the servers. Further, the above described system and methods, in whole or in part, may be implemented in a disk storage system for a computer system to improve the robustness of disk read and write operations, as shown in the example of FIG. 23. Two or more storage devices, such as disk drives, may be provided, for instance, in a single computing system to provide fault tolerant storage operations in the event of a device failure of one of the storage devices.

In FIG. 23, a block diagram of a system for multicasting replications of reads and writes to mass storage devices is shown. In this example, a server 350 is provided with multiple and redundant network attached storage devices 352, 354, such as mass storage devices providing persistent storage of data. Each storage device 352, 354 may be provided with a listening device 356, 358, as describe herein, and a multicasting engine 360 may be provided to communicate between the server 350 and the pairs of listening devices 356, 358 and storage devices 352, 354. Accordingly, when the server 350 writes data, for instance, the multicasting engine 360 receives the write request and transmits or multicasts the write request over a network 362 to at least two listening devices 356, 358, which each independently and completely process the write request and write the data to their respective persistent storage device 352, 354. In this manner, if one of the storage devices 352, 354 becomes unavailable or fails, then the server 350 can continue to operate utilizing the other available storage device.

Existing computer networks may be provided with embodiments of the invention in various manners. In one example, a server farm or regional data center of an application service provider can be provided with a multicasting engine 30 embodied in a server, and once the multicasting engine 30 is operational, each user session is configured to be serviced by at least two application servers located in geographically different servers farms or data centers.

Figure 24:
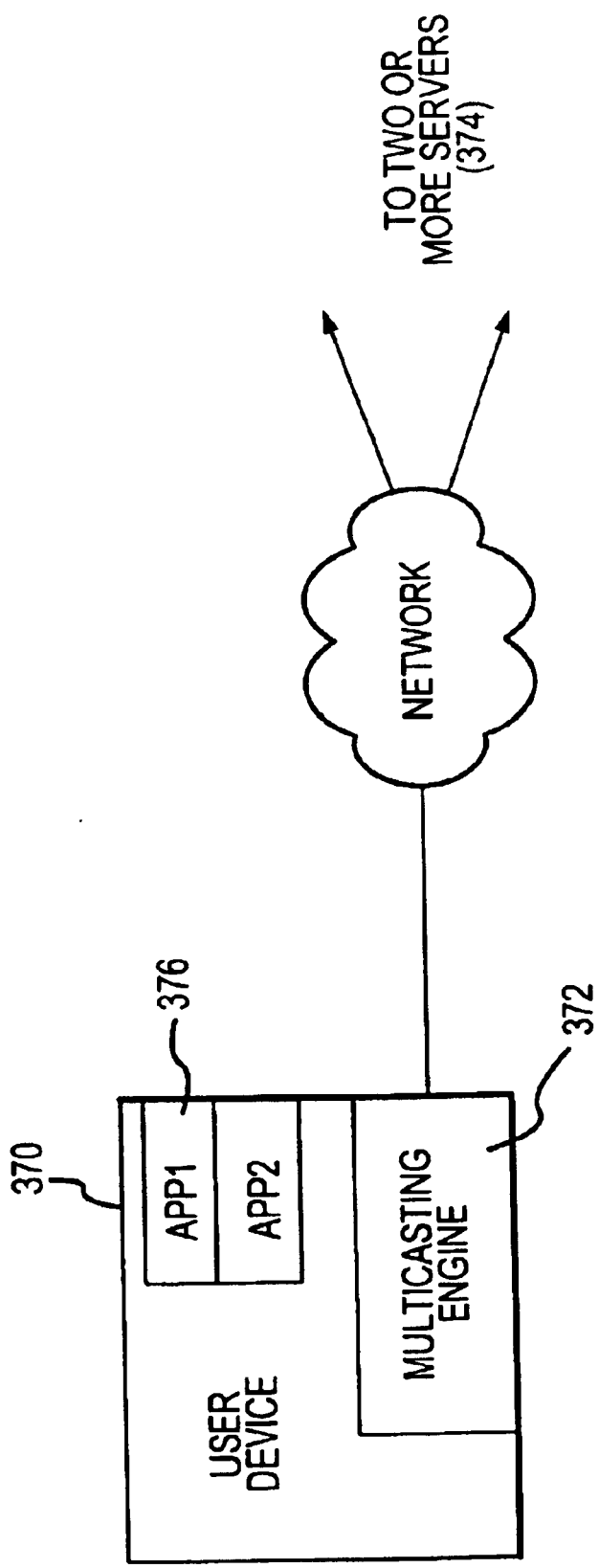
FIG. 24 illustrates an alternative embodiment wherein one or more portions of a multicasting engine are implemented within a user device.

While the multicasting engine has been shown and described herein as a device or module being separate from the user device, it is understood that one or more portions of the multicasting engine or operations thereof may be integrated with or incorporated in the user device as desired. In FIG. 24, a user device 370 is provided with a multicasting engine 372 or one or more functions of a multicasting engine as described herein. In this embodiment, the multicasting engine may be implemented in the user device 370 so as to pass a single result received from the two or more servers 374 to the application layer 376 of the user device 370. In FIG. 24, the application layer 376 is shown to contain application 1 and application 2, in this example. For instance, if application 1 is an application for which multicasting is utilized, then the data processing requests generated by application 1 are transmitted by multicasting engine 372 to the two or more servers 374 for processing in each of the servers, as described above. When the results from the two or more servers are generated and transmitted to the multicasting engine 372, the multicasting engine 372 passes a single result to the application layer 376 for application 1, in this example.

Figure 25:
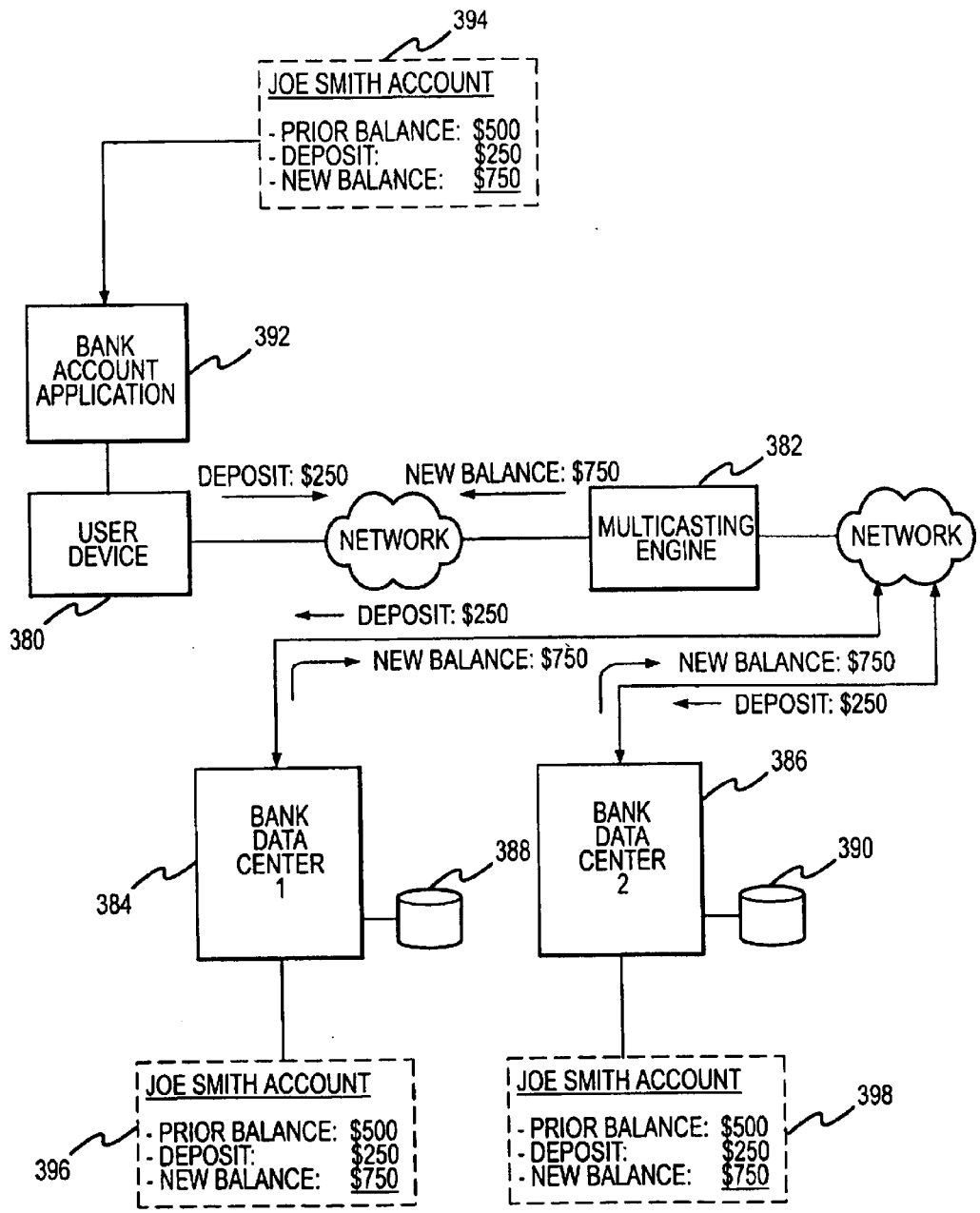
FIG. 25 illustrates an example of a bank account transaction implemented using a multicasting system.
Figure 26:
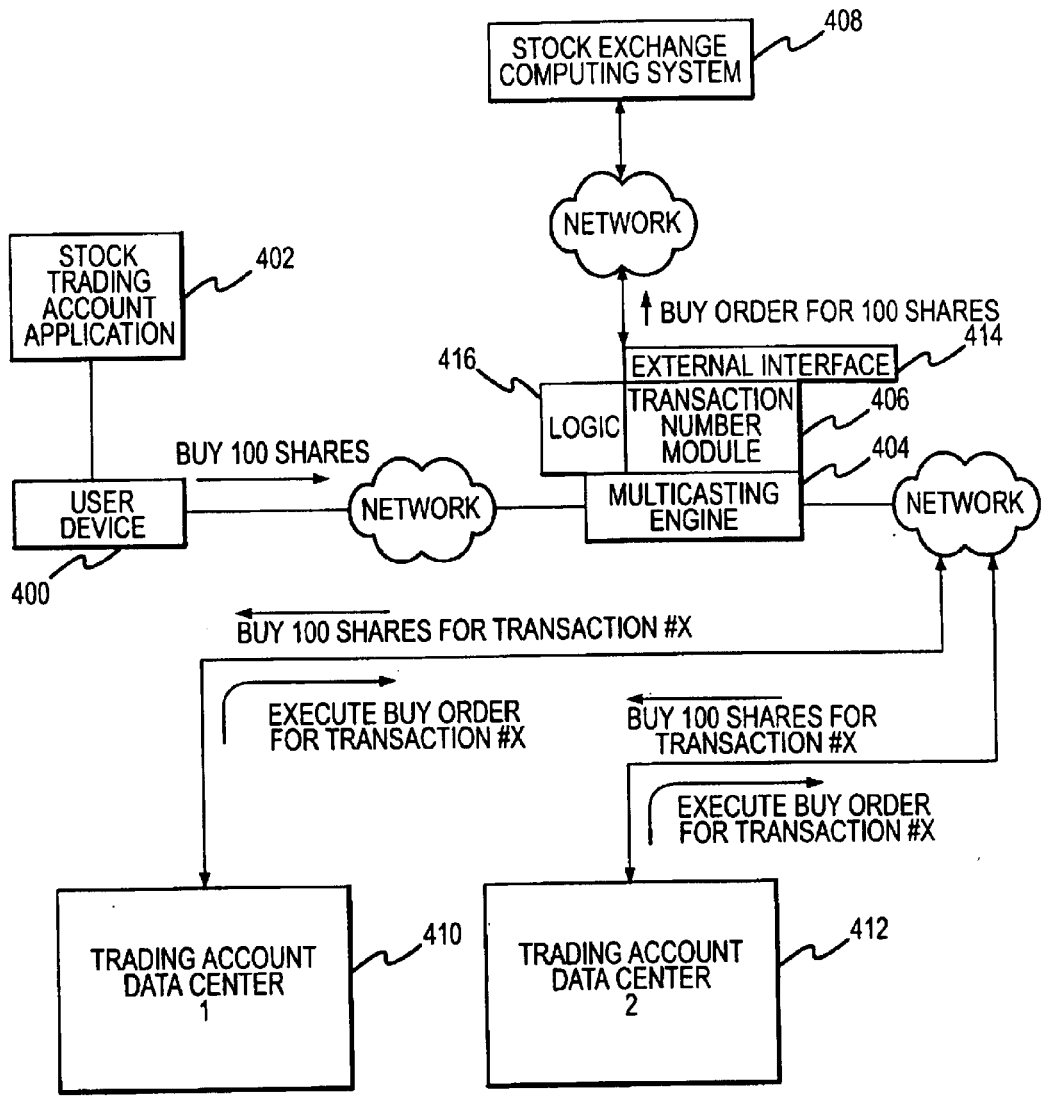
FIG. 26 illustrates an example of a stock purchase transaction implemented using a multicasting system.

Having described various embodiments of the present invention, FIGS. 25–26 illustrate examples of systems that may incorporate embodiments of the present invention therein. It is understood that the examples of FIGS. 25–26 are for illustrative purposes only, and that embodiments of the present invention may be incorporated into a wide variety of different computing environments or computing systems. FIG. 25 illustrates an example of a bank account system utilizing an example of multicasting described herein, while FIG. 26 illustrates an example of a stock trading enterprise or platform incorporating an embodiment of the present invention.

With reference to FIG. 25, a bank account system utilizing multicasting is shown, in accordance with one embodiment of the present invention. The system includes a user device 380 coupled with a multicasting engine 382, which is coupled with at least two data centers 384, 386 having persistent storage devices 388, 390, respectively. In this example, the user device 380 is operating a bank account application program 392, which contains account information 394 for one or more customers of the bank. Bank account information 394 is shown as "Joe Smith's" account, and includes information such as the account's prior balance and account activity. In accordance with the present invention, each bank data center 384 and 386 maintains complete and independent copies of the bank account information 394. These copies are shown as 396 and 398. Whenever the bank account application 392 operating on user device 380 has a request for data processing with regard to the "Joe Smith" account of this example (i.e., reading account information or writing account information), then these requests are passed from the user device 380 to the multicasting engine 382, which transmits the request to at least bank data center 384 and bank data center 386. Each bank data center 384, 386 completely and independently processes the data request and returns a result to the multicasting engine 382. The multicasting engine 382 returns a single result to the user device 380, in one embodiment.

For instance, as shown in FIG. 25, assume that the account information 394 has a prior balance of $500, and $250 is being deposited in the account. At the user device 380, a user (such as a bank teller) would enter the $250 deposit amount into the bank account application program 392. The user device 380 would transmit a write request of "deposit $250" to the multicasting engine 382, which would then multicast or transmit the "deposit $250" request to at least bank data center 384 and bank data center 386. Bank data center 384 would receive the "deposit $250" request and process the request at the bank data center 384, resulting in a new balance for the account of $750. Bank data center 384 would store the new balance amount in its persistent storage device 388 and return a result to the multicasting engine 382 indicating that the new account balance is $750. Likewise, bank data center 386 would receive the "deposit $250" request and process the request in its account information 398 to calculate a new balance of $750. Bank data center 386 would store the new balance amount in its persistent storage device 390, and transmit a return result to the multicasting engine 382 indicating that the new account balance is $750.

The multicasting engine 382 would receive, asynchronously in one example, the results from bank data center 384 and from bank data center 386. In accordance with one embodiment of the present invention, the multicasting engine 382 would pass a single result to the user device 380 indicating that the new account balance is $750. Accordingly, the bank account application 392 would update its account information 394 to reflect the new account balance.

It can be seen that in FIG. 25 each bank data center 384 and 386 maintains separate, independent, complete, and state accurate data sets of the bank account information. In this manner, if one of the bank data centers (for instance, bank data center 384) becomes unavailable, fails, or is the subject of a disaster, then the user device 380 and bank account application program 392 can transact banking business utilizing bank data center 386 without significant delays.

FIG. 26 illustrates an example of a stock trading system or enterprise utilizing multicasting in accordance with one embodiment of the present invention. In FIG. 26, a user device 400 is provided with a stock trading account application program 402, which permits a user to execute stock trading transactions over a network. In this example, the user device 400 is coupled with a multicasting engine 404 having a transaction number module associated therewith. The transaction number module is a module that generates a unique transaction or confirmation number and associates this number with requests received from the user device. This transaction number may be the same as the sequence number shown in FIGS. 6 and 7, or may be mapped to or associated with the sequence number, in one example.

For instance, if a request received from a user device should be supplied with a unique transaction or confirmation number, then the transaction number module 406 generates the unique number and associates the unique number with the request. If a unique transaction number is associated with the processing of a request, then multicasting engine 404 transmits the request along with the transaction number to the at least two trading account data centers 410, 412. As shown in FIG. 26, the multicasting engine may also be provided with an external interface 414 for communicating with an external or third party network to perform one or more computing processes. In this example, the external interface 414 is coupled with a stock exchange computing system 408 such as the NASDAQ computing system or the NYSE computing system to execute stock trades.

The multicasting engine 404 may also be provided with logic 416 for determining communications over external interface 414 with the computing system 408. For example, when the multicasting engine receives data from trading account data center 410 or 412, logic 416 may determine that, based on the data received, a message should be transmitted over external interface 414 to computing system 408.

In the example of FIG. 26, assume that the user of application 402 has generated a request to "buy 100 shares." The user device 400 transmits this request to the multicasting engine 404. In this embodiment, the multicasting engine 404 utilizes a transaction number module 406 which generates a unique transaction number to be associated with this request. In one embodiment, the multicasting engine 404 transmits the request to "buy 100 shares" along with the transaction number created by the transaction number module 406. As described variously above, the multicasting engine transmits this request and associated transaction number to at least two trading account data centers 410, 412 for processing therein. Each trading account data center 410, 412 completely and independently process this request—for instance, by determining whether the user's trading account has sufficient funds to satisfy this request to "buy 100 shares." Assuming there are sufficient funds to satisfy the request, each trading account data center 410, 412 will generate an "execute" of the buy order for this particular transaction and transmit this information to the multicasting engine 404. When the multicasting engine receives this data from the trading account data centers 410 or 412, the Logic 416 determines that the "execute buy order" message received from the data centers 410, 412 necessitates that a message be generated and transmitted over the external interface 414 to the stock exchange computing system 408. Accordingly, in one embodiment, the Logic 416 performs the appropriate message (i.e., "buy 100 shares") and transmits this message to the stock exchange computing system 408. In this example, it can be seen that although at least two trading account data centers 410, 412 processed and generated a message to "execute" the buy order for 100 shares, the actual transaction was only executed in one instance with the stock exchange computing system 408.

It can be seen that in the example of FIG. 26, if trading account data center 410 was struck by disaster, failed, or became otherwise unavailable, the user's request to buy 100 shares could be satisfied by utilizing trading account data center 412 without significant delays due to the unavailability of trading account data center 410.

Accordingly, it can be seen that the various embodiments of the invention will provide the user with continuous access to its data and to an operational networked system irrespective of a server failure or unavailability due to disaster or other catastrophic failure.

While the above description and drawings show two or three servers running a one or two applications and handling requests from one or two users, it is understood that a larger number of servers could be used in a similar manner to handle multiple applications running concurrently with numerous requests from multiple users, depending upon the particular implementation.

Various embodiments of the present invention may be embodied as a computer program products including computer usable medium and computer readable code embodied on the computer usable medium, the computer readable code including computer readable program code devices configured to cause the computer to perform or effect one or more of the operations described herein.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

We claim:

1. An apparatus for processing communications between a user device and at least two servers, comprising:
    a module for receiving a user request relating to an application program;
    a module for transmitting the user request to the at least two servers for processing therein;
    a module for forwarding to the user device a result received from one of the at least two servers, wherein the result is responsive to the user request;
    a module for storing a plurality of requests received from the user device;
    a module for storing a plurality of results received from at least one of at least two servers; and
    a module for associating the plurality of results to a corresponding one of the plurality of requests.

2. A method for processing communications between a user device and at least two servers, comprising:
    receiving a user request relating to an application program;
    transmitting the user request to the at least two servers for processing therein; and
    forwarding to the user device a result received from one of the at least two servers, wherein the result is responsive to the user request;
    storing a plurality of requests received from the user device;
    storing a plurality of results received from at least one of the at least two servers; and
    associating the plurality of results to a corresponding one of the plurality of requests.

3. The method of claim 2, further comprising: creating a record associated with the user request.

4. The method of claim 3, wherein the record has a unique identifier associated with the record.

* * * * *